United States Patent
Chow et al.

(10) Patent No.: US 10,295,836 B2
(45) Date of Patent: May 21, 2019

(54) LENS STRUCTURE AND DUAL-PURPOSE EYEGLASSES WITH SUNGLASSES AND 3D GLASSES FUNCTIONS

(71) Applicant: Shenzhen Time Waying Technology Co., Ltd., Shenzhen, Guangdong (CN)

(72) Inventors: Wingyip Kenny Chow, Shenzhen (CN); Bin Zhong, Shenzhen (CN)

(73) Assignee: Shenzhen Time Waying Technology Co., Ltd., Shenzhen (CN)

( * ) Notice: Subject to any disclaimer, the term of this patent is extended or adjusted under 35 U.S.C. 154(b) by 695 days.

(21) Appl. No.: 14/334,668

(22) Filed: Jul. 18, 2014

(65) Prior Publication Data
US 2014/0327870 A1    Nov. 6, 2014

Related U.S. Application Data

(63) Continuation of application No. PCT/CN2012/073049, filed on Mar. 26, 2012.

(30) Foreign Application Priority Data

Jan. 18, 2012 (CN) ........................ 2012 1 0015425
Feb. 28, 2012 (CN) .................... 2012 2 0069081 U

(51) Int. Cl.
*G02C 5/00* (2006.01)
*G02C 7/12* (2006.01)
*G02B 27/26* (2006.01)

(52) U.S. Cl.
CPC .............. *G02B 27/26* (2013.01); *G02C 5/001* (2013.01); *G02C 7/12* (2013.01)

(58) Field of Classification Search
CPC ........... G02B 27/26; G02C 5/001; G02C 7/12
(Continued)

(56) References Cited

U.S. PATENT DOCUMENTS 3,667,834 A * 6/1972 Davison ................. G02C 5/20
                                                351/111
4,844,606 A * 7/1989 Smith ................. G02C 5/2281
                                                16/228
(Continued)

FOREIGN PATENT DOCUMENTS

CN        201522587 U     7/2010
CN        101900889 A    12/2010
(Continued)

OTHER PUBLICATIONS

International Search Report of PCT Patent Application No. PCT/CN2012/073049 dated Nov. 15, 2012.

*Primary Examiner* — Evan P Dzierzynski
*Assistant Examiner* — Mitchell T Oestreich
(74) *Attorney, Agent, or Firm* — JCIPRNET

(57) ABSTRACT

A lens structure including a quarter wave plate layer and a linear polarizing plate layer is provided. When the linear polarizing plate layer is located at an outer side of the lens away from a viewer's eye, the polarizing axis of the linear polarizing plate layer is in a vertical direction. The lens structure can be used to make dual-purpose eyeglasses with sunglasses and 3D glasses functions. Any one of the quarter wave plate layer and the linear polarizing plate layer can be disposed at the outer side away from the user's eyes by adjusting the orientation of the lens of the present invention. When the linear polarizing plate layer is located at the outer side away from the user's eyes, the optical axis of the linear polarizing plate layer is in the vertical direction. Thus, the dual-purpose eyeglasses with both sunglasses and 3D glasses functions can be achieved.

15 Claims, 26 Drawing Sheets

(58) Field of Classification Search
USPC .......................................................... 351/47
See application file for complete search history.

(56) References Cited

U.S. PATENT DOCUMENTS

| 7,762,661 | B2* | 7/2010 | Beasley | G02C 7/06 |
|---|---|---|---|---|
| | | | | 351/54 |
| 2011/0199680 | A1* | 8/2011 | Saylor | G02B 27/26 |
| | | | | 359/465 |
| 2011/0205626 | A1* | 8/2011 | Saylor | G02B 27/26 |
| | | | | 359/465 |

FOREIGN PATENT DOCUMENTS

| CN | 102087419 A | 6/2011 |
|---|---|---|
| WO | 20110111267 A1 | 9/2011 |

* cited by examiner

LENS STRUCTURE AND DUAL-PURPOSE EYEGLASSES WITH SUNGLASSES AND 3D GLASSES FUNCTIONS

CROSS REFERENCE TO RELATED APPLICATIONS

The present application is a Continuation Application of PCT application No. PCT/CN2012/073049 filed on Mar. 26, 2012, which claims the benefit of Chinese Patent Application Nos. 201210015425.0 filed on Jan. 18, 2012 and 201220069081.7 filed on Feb. 28, 2012. All the above are hereby incorporated by reference.

FIELD

The present invention relates to eyeglasses technology and, more particularly, to a lens structure and dual-purpose eyeglasses with sunglasses and 3D glasses functions.

BACKGROUND

Currently the scale of 3D industry is gradually taking shape. In the 3D industry, the 3D video information technology is an inevitable trend in the development of information technology and a key technology for industry competitive forces. Making a product versatile and increasing its practicality while maintaining the product quality and reducing its cost can make an enterprise more competitive to some extent.

Taking 3D glasses as an example, due to the single function of existing 3D glasses, a user will leave the 3D glasses unused after watching a 3D movie. Therefore, the existing 3D glasses have poor practicality, which results in a waste of resources. The 3D glasses would become more popular if some more frequently-used functions are added.

SUMMARY

The first technical problem to be solved by the present invention is to provide a lens structure for making dual-purpose eyeglasses with sunglasses and 3D glasses functions.

The present invention provides a lens structure. The lens includes a quarter wave plate layer and a linear polarizing plate layer. When the linear polarizing plate layer is located at an outer side of the lens away from a viewer's eye, an optical axis of the linear polarizing plate layer is in a vertical direction.

The present invention further provides a pair of dual-purpose eyeglasses with sunglasses and 3D glasses functions, including an eyeglass frame, and lenses and two temples mounted to the eyeglass frame. Each lens includes a quarter wave plate layer and a linear polarizing plate layer. The lenses and two temples are pivotable relative to each other. Any one of the quarter wave plate layer and the linear polarizing plate layer is exposable at an outer side of the lens away from a viewer's eye.

Further, each lens is pivotally mounted to the eyeglass frame and has a pivot axle pivotally connected to the eyeglass frame. The pivot axle is vertically or horizontally connected to the eyeglass frame or obliquely connected to the eyeglass frame at an angle to the horizontal direction.

Further, the eyeglasses further include a lens frame to which the lenses are fixedly mounted, and the pivot axle projects from the lens frame.

Further, the pivot axle is vertically or horizontally pivotally connected to the lens frame. The eyeglasses have one such lens frame, and the lenses are fixedly mounted to the lens frame and synchronously rotatable about the horizontal direction or vertical direction.

Further, the eyeglasses have two such lens frames, each lens frame is fixedly mounted with one such lens, and the two lenses are independently rotatable about a horizontal direction, a vertical direction or an oblique direction of the pivot axle.

Further, a notch or protrusion is formed in an inner side of the eyeglass frame, and a protrusion or notch is formed on the lens frame at a location corresponding to the notch or protrusion of the eyeglass frame for engaging with the notch or protrusion of the eyeglass frame.

Further, a pushing block projects from the lens frame for facilitating pushing the lens.

Further, the pivot axle of the lens is at a 45-degree angle to the horizontal direction. When the lens is flipped such that the linear polarizing plate layer is located at a side adjacent the viewer's eye, a polarizing axis of the linear polarizing plate layer is in the horizontal direction.

Further, the two temples are pivotally mounted to the eyeglass frame.

Further, one end of each temple includes a connecting member, and the connecting member is pivotally mounted to the eyeglass frame and rotatable about a vertical direction.

Further, the connecting member includes a main body and two pivot axles projecting from opposite sides of the main body, respectively. The eyeglass frame has connecting holes for rotatably receiving the two pivot axles, respectively. One of the pivot axles includes projecting teeth extending outwardly from opposite sides of that pivot axle. The connecting hole for engaging with the pivot axle having the projecting teeth is a stepped hole which is shaped corresponding to the pivot axle.

Further, the temples are pivotally mounted to the connecting member.

Further, horizontal connecting pins project from the eyeglass frame, and each temples is pivotally attached around one corresponding connecting pin and rotatable about the horizontal direction.

Further, a positioning sleeve is attached around a portion of each temple where the temple is pivotally connected to the connecting member. A protrusion or recess is formed in the positioning sleeve. A recess or protrusion is formed on the connecting member at a location corresponding to the protrusion or recess of the positioning sleeve for engaging with the protrusion or recess of the positioning sleeve.

The present invention further provides a pair of dual-purpose eyeglasses with sunglasses and 3D glasses functions, including a lens and a clamp. The lens includes a quarter wave plate layer and a linear polarizing plate layer. A polarizing axis of the linear polarizing plate layer is in a vertical direction. The clamp includes a first clamping portion for clamping the lens and a second clamping portion for clamping another pair of eyeglasses.

The lens structure provided by the present invention can be used to make dual-purpose eyeglasses with sunglasses and 3D glasses functions. Any one of the quarter wave plate layer and the linear polarizing plate layer can be exposed at the outer side away from the user's eyes by adjusting the orientation of the lenses of the present invention. When the linear polarizing plate layer is located at the outer side away from the user's eyes, the optical axis of the linear polarizing plate layer is in the vertical direction. Thus, the dual-purpose eyeglasses with both sunglasses and 3D glasses functions can be achieved. The user is able to adjust the lens orientation to select a corresponding function by themselves according to needs. In comparison with the existing 3D glasses or sunglasses with single function, the eyeglasses of the present invention can be used for two purposes and have more practical value.

DESCRIPTION OF THE EMBODIMENTS

Figure 1A:
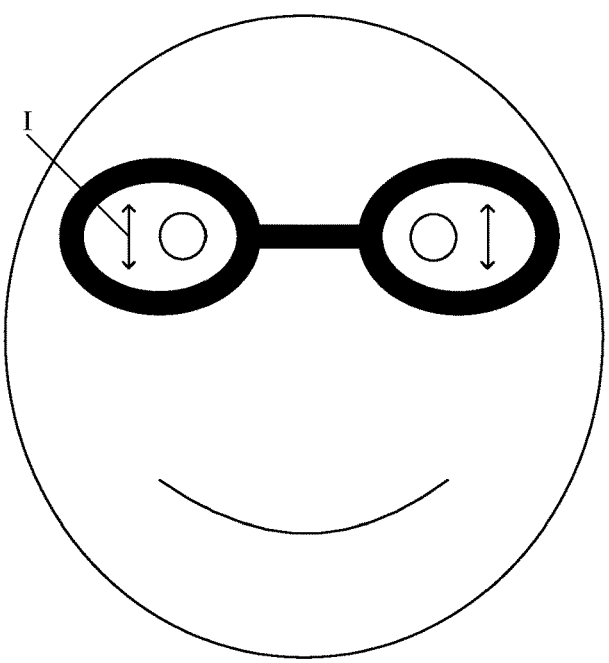
FIG. 1A illustrates polarization characteristics of conventional sunglasses.
Figure 1B:
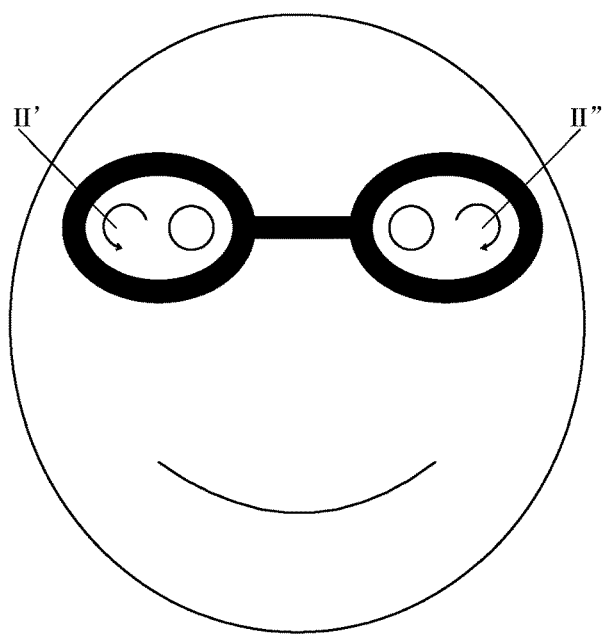
FIG. 1B illustrates polarization characteristics of conventional 3D glasses.

In order to make the objectives, technical solutions and advantages become more apparent, more detailed description of the present invention is made below with reference to the drawings and embodiments. It is to be understood that the specific embodiments explained herein are intended for the purpose of description only and shall not be used to limit the present invention FIG. 1A and FIG. 1B illustrate polarization characteristics of conventional sunglasses and 3D glasses, respectively. In FIG. 1A, "I" represents an optical axis of a linear polarizing plate layer, which is in a vertical direction. In FIG. 1B, "II'" and "II''" represent the polarizing directions of left-eye and right-eye glasses, respectively. The present invention combines the polarization characteristics of both the conventional sunglasses and 3D glasses. That is, the present invention provides a lens structure that includes a quarter wave plate layer and a linear polarizing plate layer.

Figure 2A:
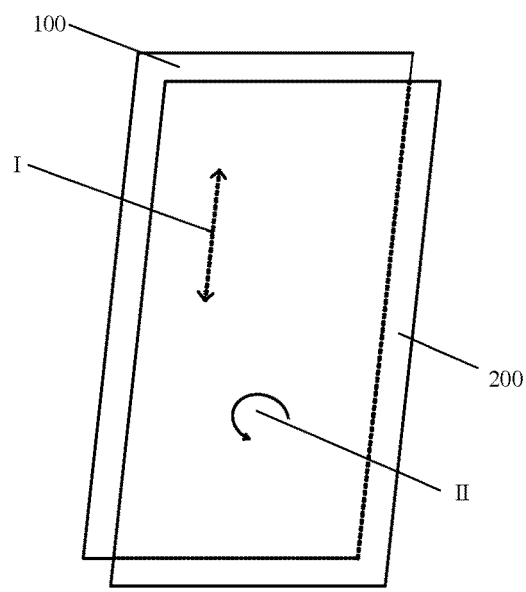
FIG. 2A illustrates the dual-purpose eyeglasses of the present invention which are used as 3D glasses.

As shown in FIG. 2A, the eyeglasses at this state can be used as 3D glasses. A linear polarizing plate layer 100 is located at an inner side, i.e. a side adjacent a viewer's eye, while a quarter wave plate layer 200 is located at an outer side away from the eye. A polarizing axis of the linear polarizing plate layer 100 is in a vertical direction. For 3D images from an outside environment, circular polarization of light is most commonly used to separate the left-eye and right-eye images which eventually creates a 3D effect. For video image light either reflected from a projection screen in a cinema or directly displayed by a 3D TV at home, a clockwise circularly polarized light is used to project an image for one eye, and a counter-clockwise circularly polarized light is used to project an image for the other eye at the same time. The pair of left and right images cooperate with each other, have a parallax and present the same scene from two different perspectives. Specifically, in the present lens structure, when the quarter wave plate layer 200 faces outwards, the two lenses achieve the circular polarization of light, with one lens allowing only the clockwise circular polarized light to pass and the other lens allowing only the counter-clockwise circular polarized light to pass, such that the viewer's left and right eyes can see their respective images without generating crosstalk. After receiving a pair of images with correct parallax, the viewer's brain synthesizes the pair of images into a 3D stereoscopic image.

Figure 2B:
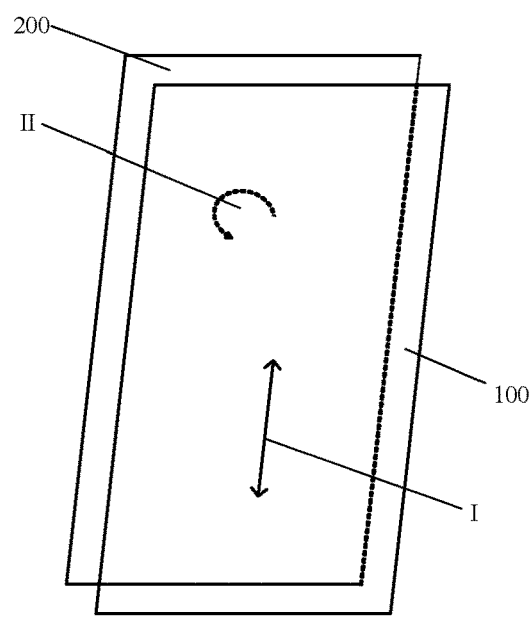
FIG. 2B illustrates the dual-purpose eyeglasses of the present invention which are used as sunglasses.
Figure 3:
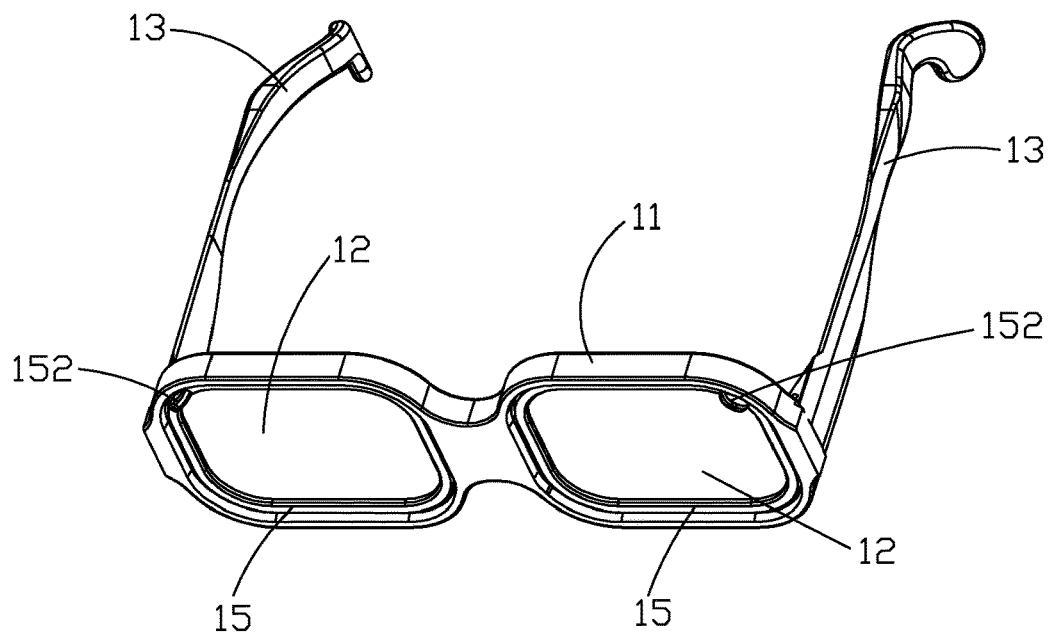
FIG. 3 is a perspective view of a first embodiment of the dual-purpose eyeglasses of the present invention.
Figure 4:
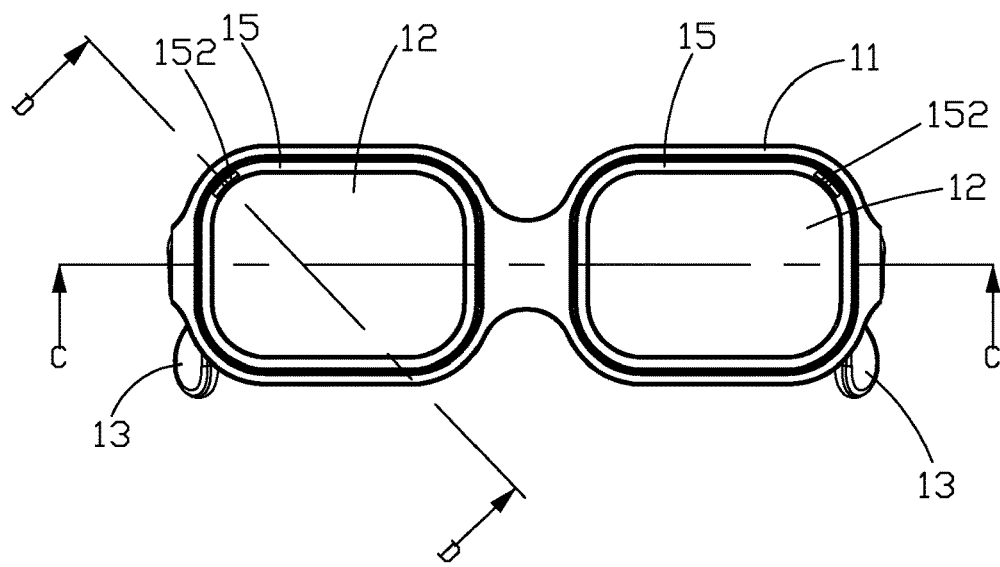
FIG. 4 is a front view of the dual-purpose eyeglasses of FIG. 3.
Figure 5:
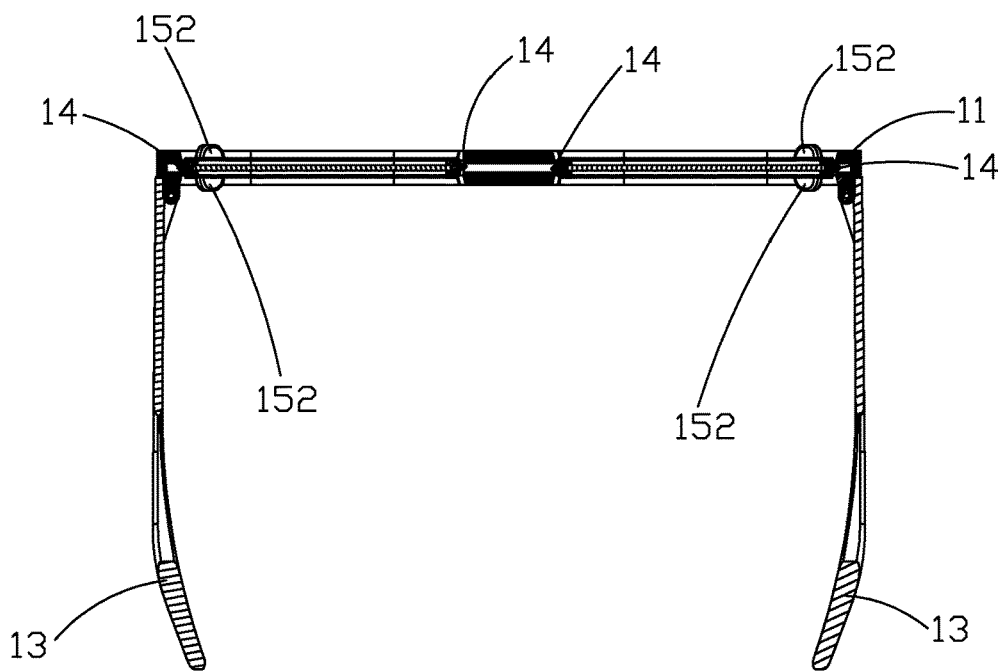
FIG. 5 is a cross-sectional view taken along line C-C of FIG. 4.
Figure 6:
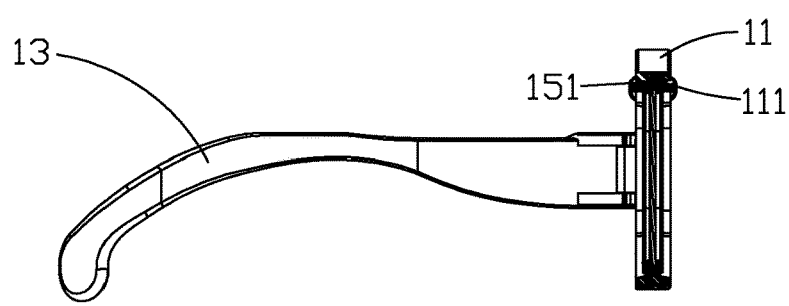
FIG. 6 is a cross-sectional view taken along line D-D of FIG. 4.
Figure 7:
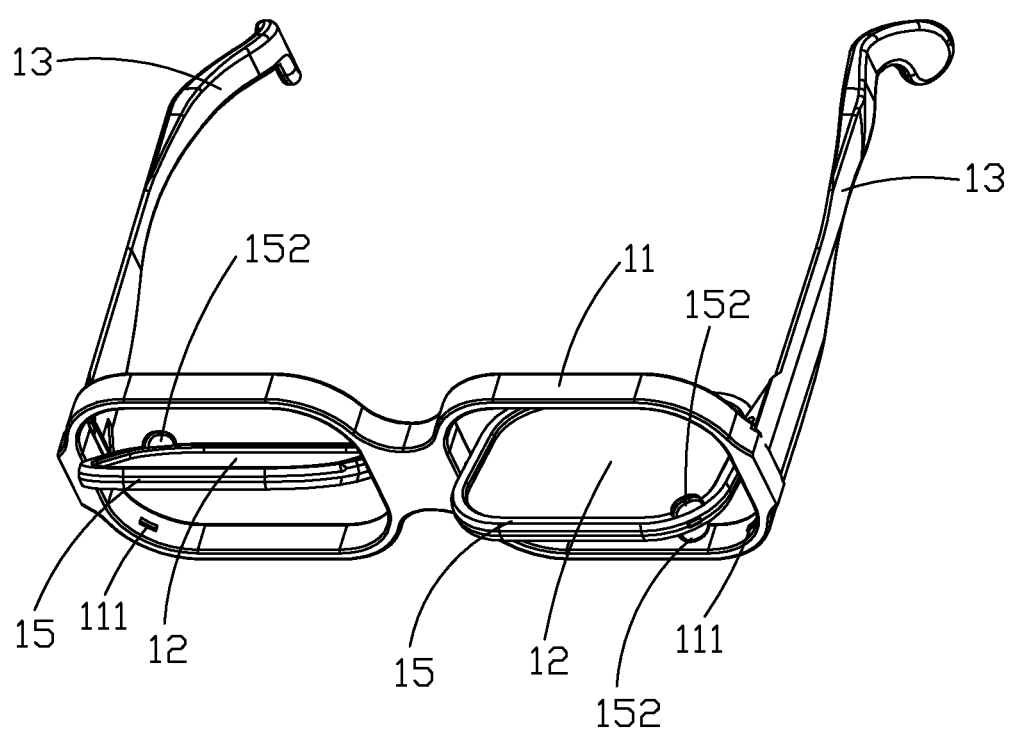
FIG. 7 illustrates the dual-purpose eyeglasses of FIG. 4 showing a pivoting state of the lenses.
Figure 8:
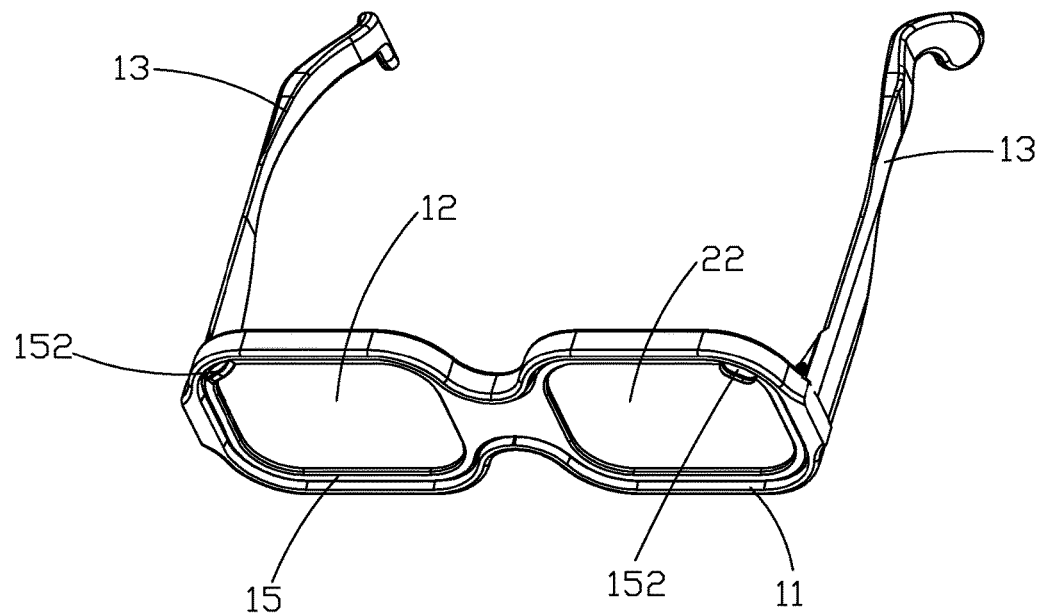
FIG. 8 is a perspective view of a second embodiment of the dual-purpose eyeglasses of the present invention.
Figure 9:
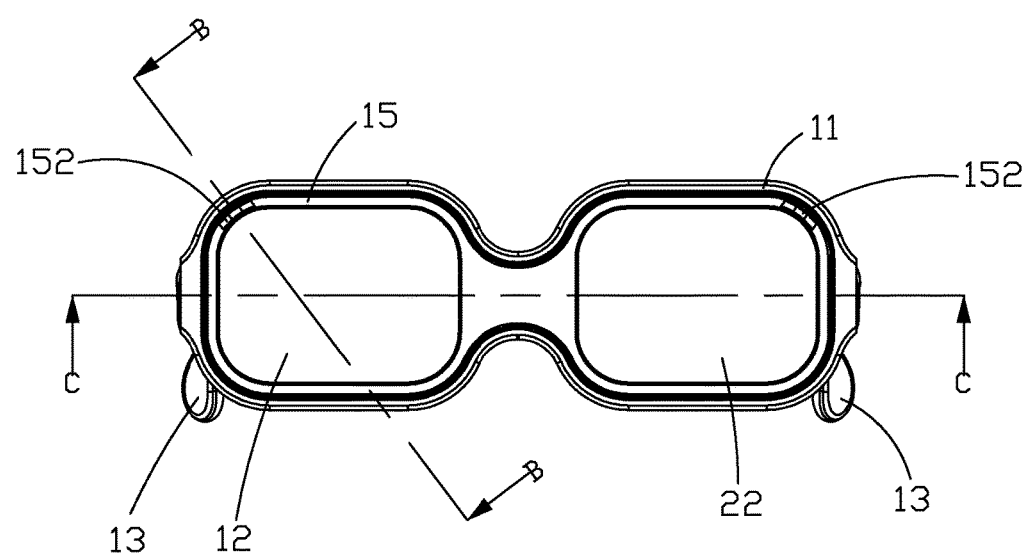
FIG. 9 is a front view of the dual-purpose eyeglasses of FIG. 8.
Figure 10:
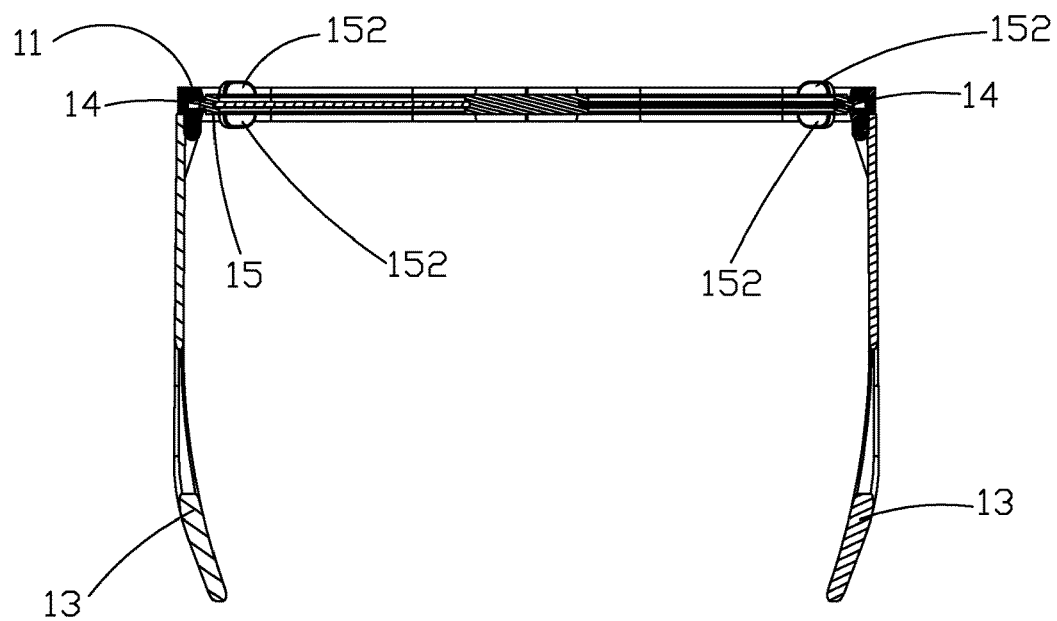
FIG. 10 is a cross-sectional view taken along line C-C of FIG. 9.
Figure 11:
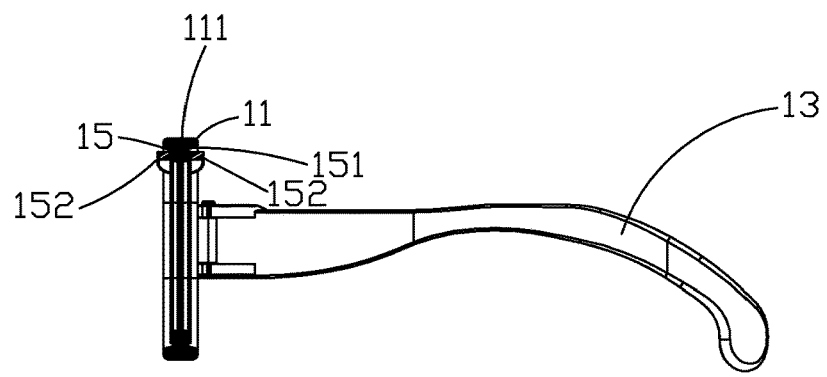
FIG. 11 is a cross-sectional view taken along line B-B of FIG. 9.
Figure 12:
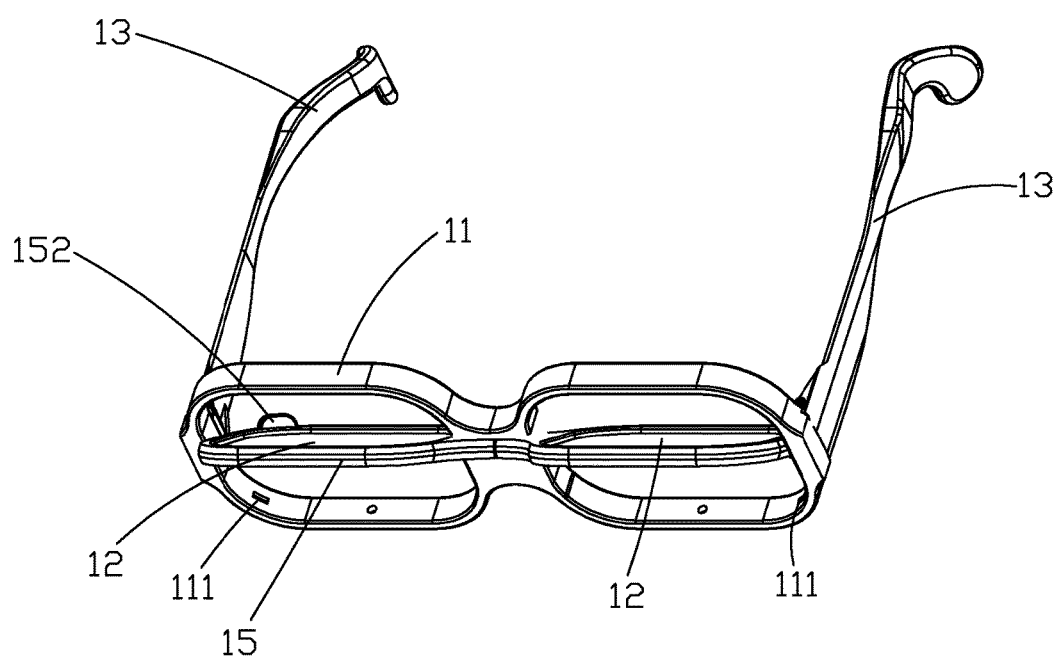
FIG. 12 illustrates the dual-purpose eyeglasses of FIG. 8 showing a pivoting state of the lenses.
Figure 13:
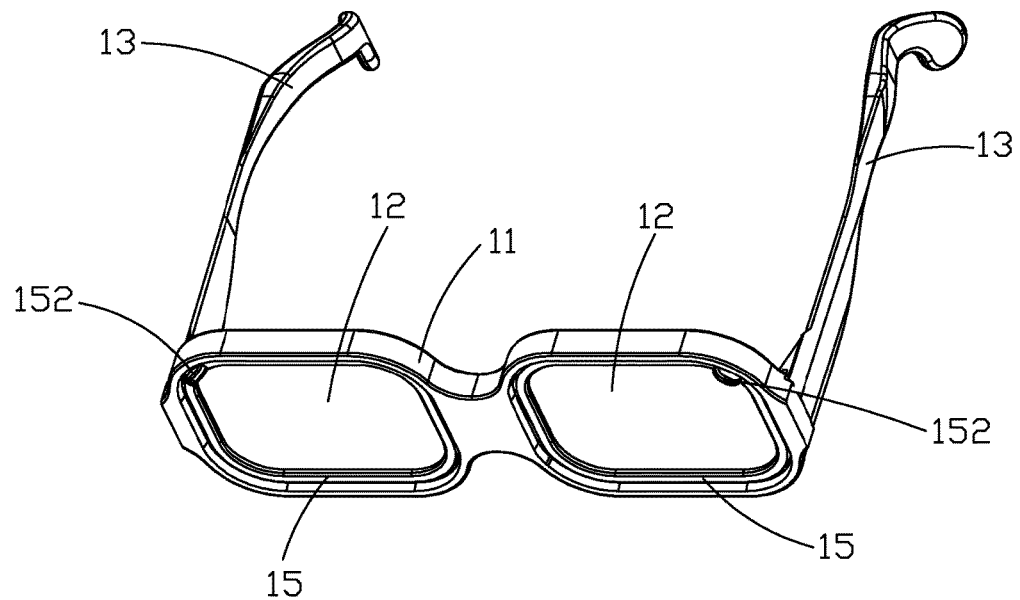
FIG. 13 is a perspective view of a third embodiment of the dual-purpose eyeglasses of the present invention.
Figure 14:
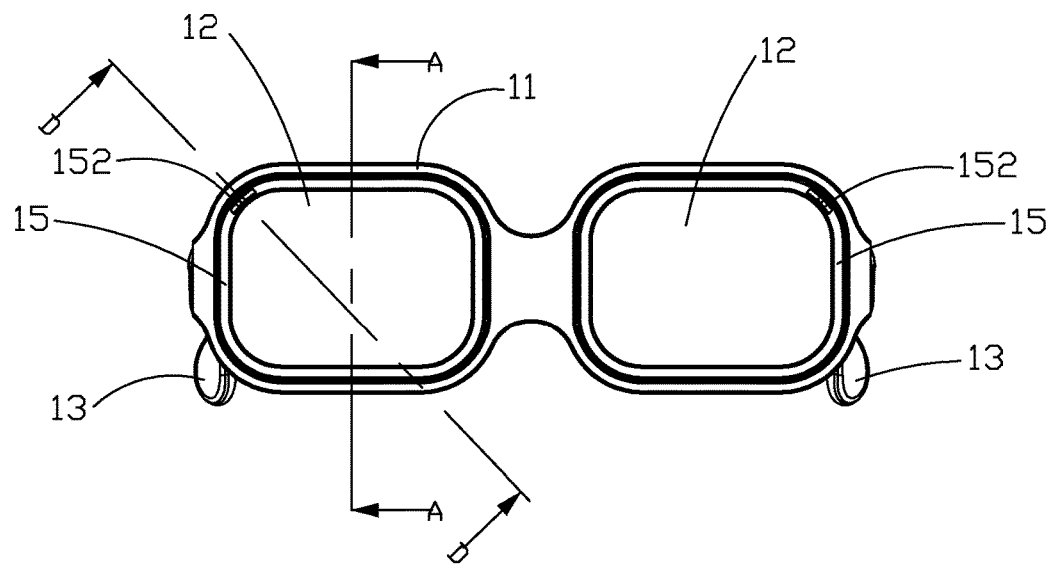
FIG. 14 is a front view of the dual-purpose eyeglasses of FIG. 13.
Figure 15:
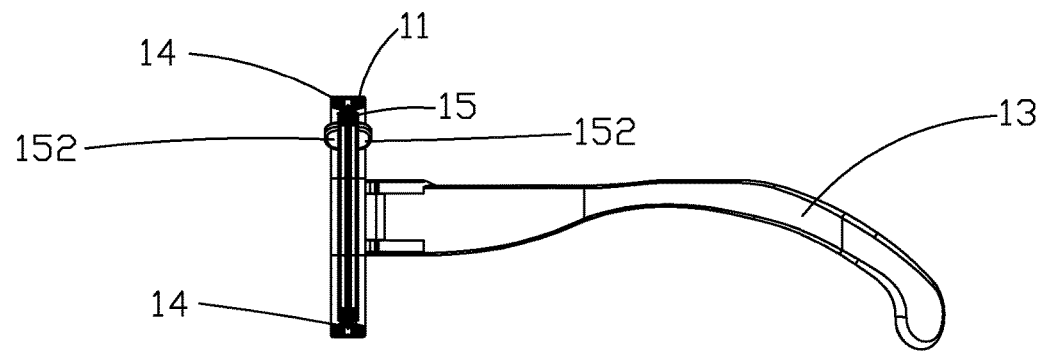
FIG. 15 is a cross-sectional view taken along line A-A of FIG. 14.
Figure 16:
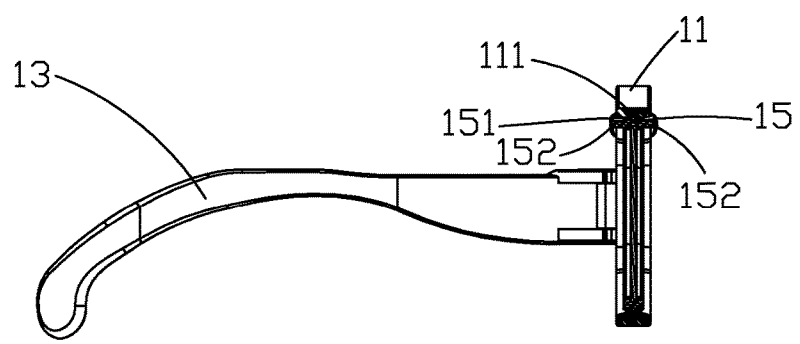
FIG. 16 is a cross-sectional view taken along line D-D of FIG. 14.
Figure 17:
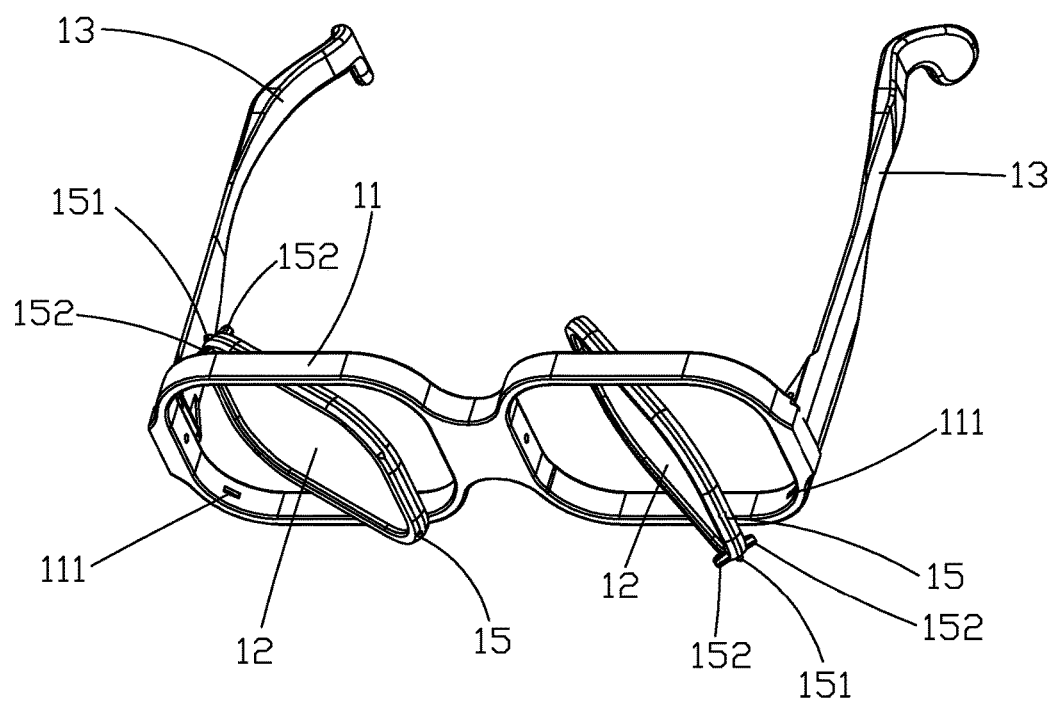
FIG. 17 illustrates the dual-purpose eyeglasses of FIG. 13 showing a pivoting state of the lenses.
Figure 18:
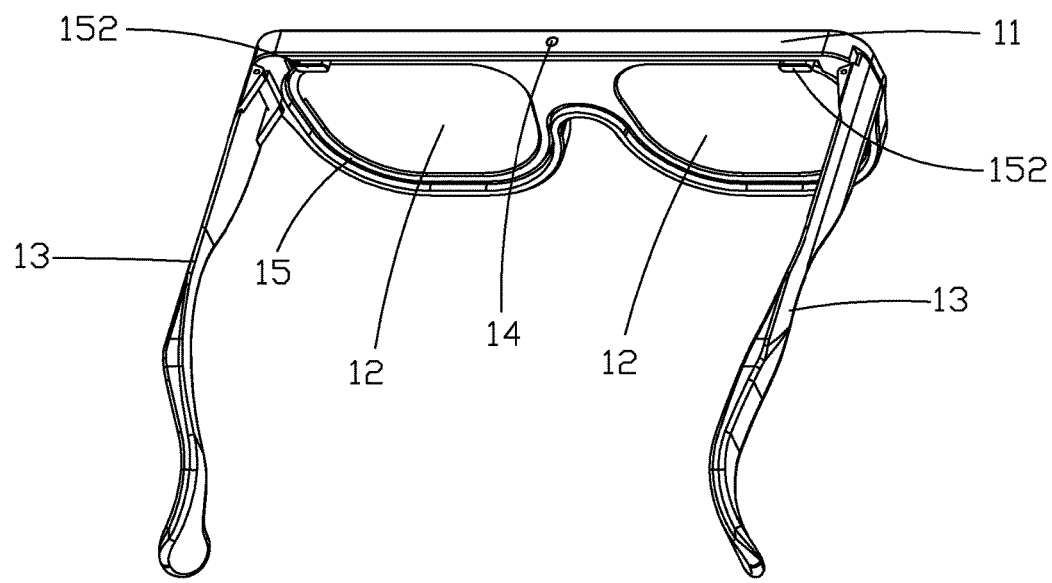
FIG. 18 is a perspective view of a fourth embodiment of the dual-purpose eyeglasses of the present invention.
Figure 19:
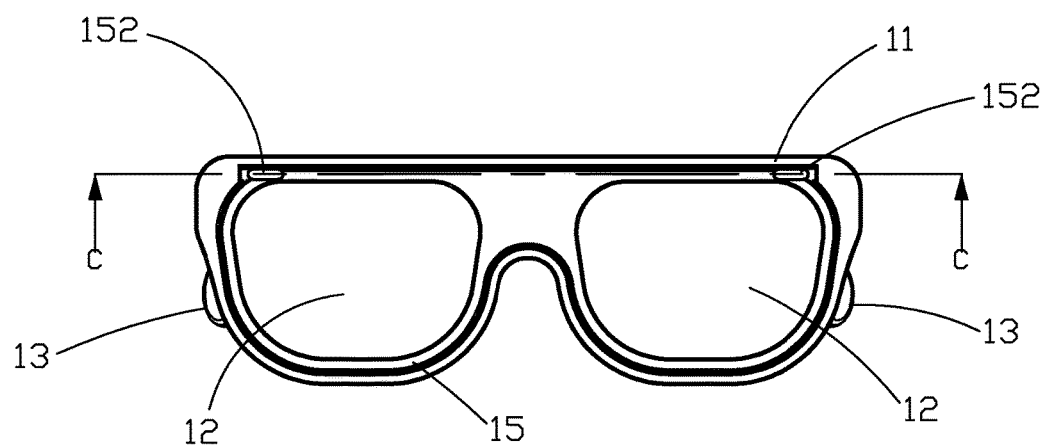
FIG. 19 is a front view of the dual-purpose eyeglasses of FIG. 18.
Figure 20:
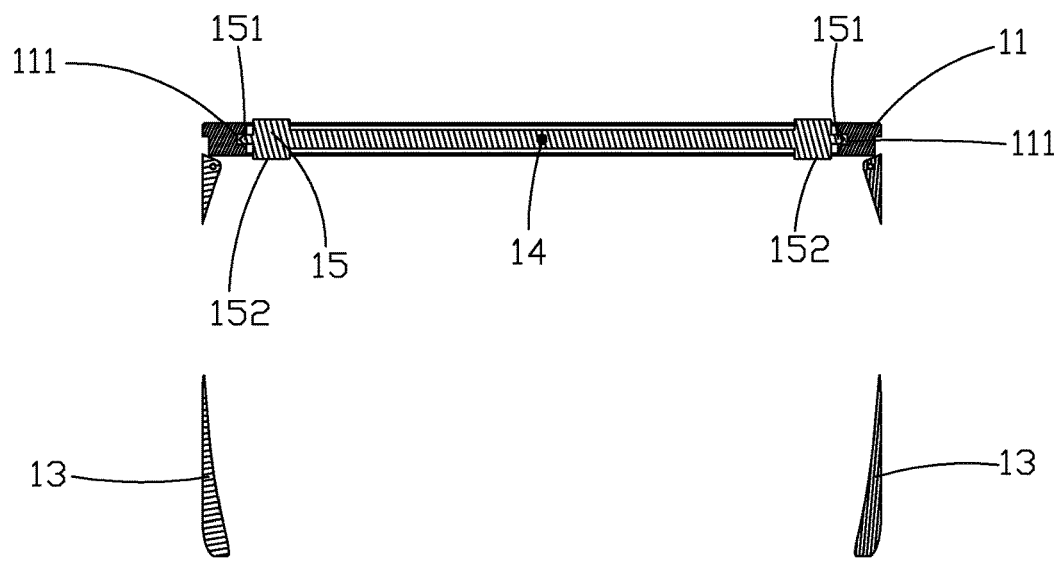
FIG. 20 is a cross-sectional view taken along line C-C of FIG. 19.
Figure 21:
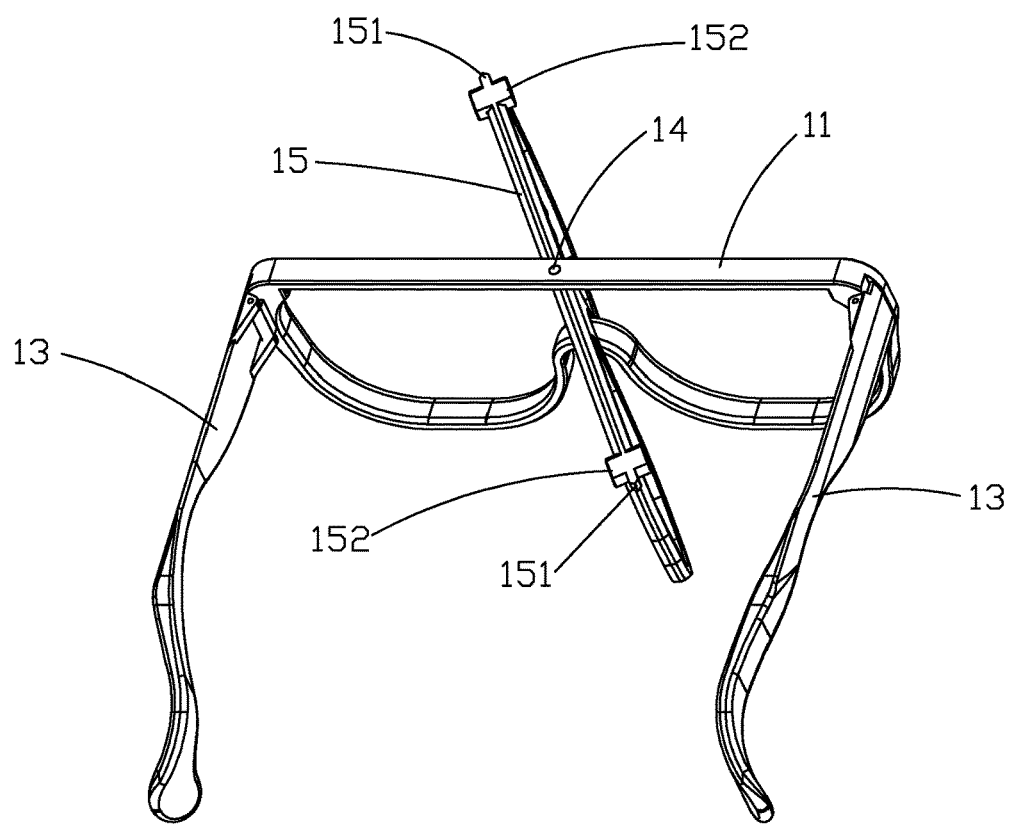
FIG. 21 illustrates the dual-purpose eyeglasses of FIG. 18 showing a pivoting state of the lenses.
Figure 22:
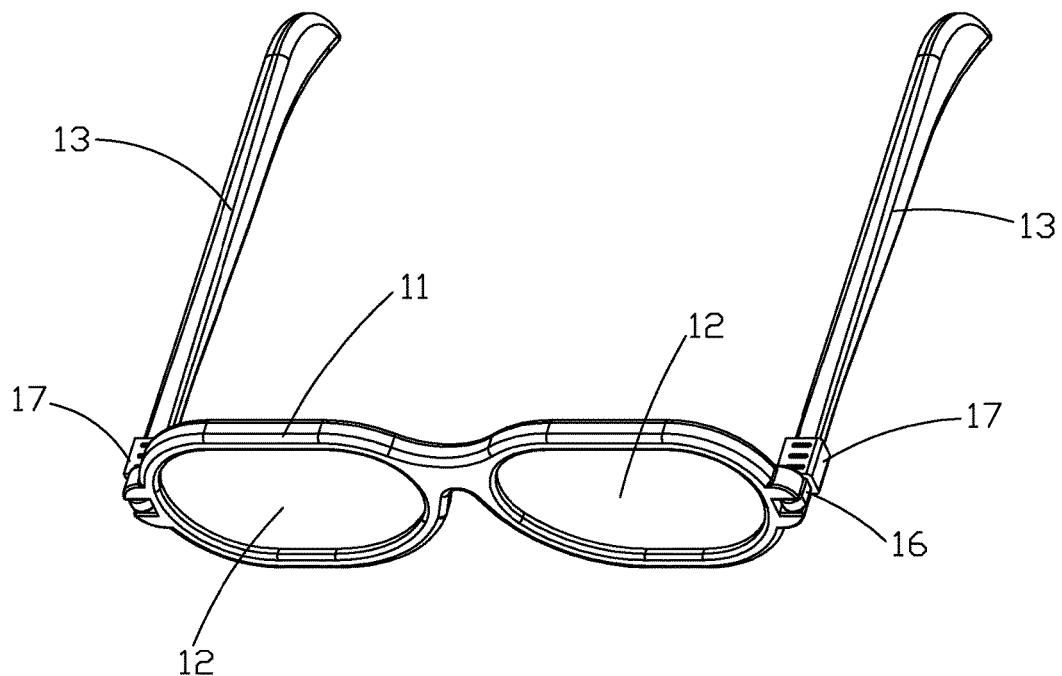
FIG. 22 is a perspective view of a fifth embodiment of the dual-purpose eyeglasses of the present invention.
Figure 23:
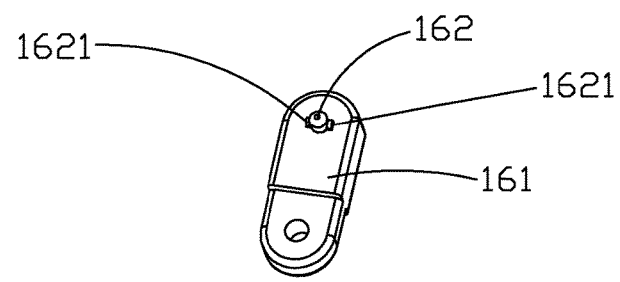
FIG. 23 is a perspective view of a connecting member of FIG. 22.
Figure 24:
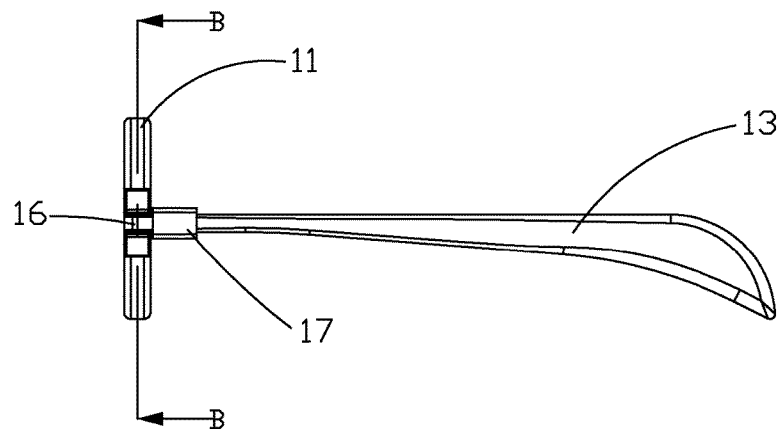
FIG. 24 is a side view of the dual-purpose eyeglasses of FIG. 22.
Figure 25:
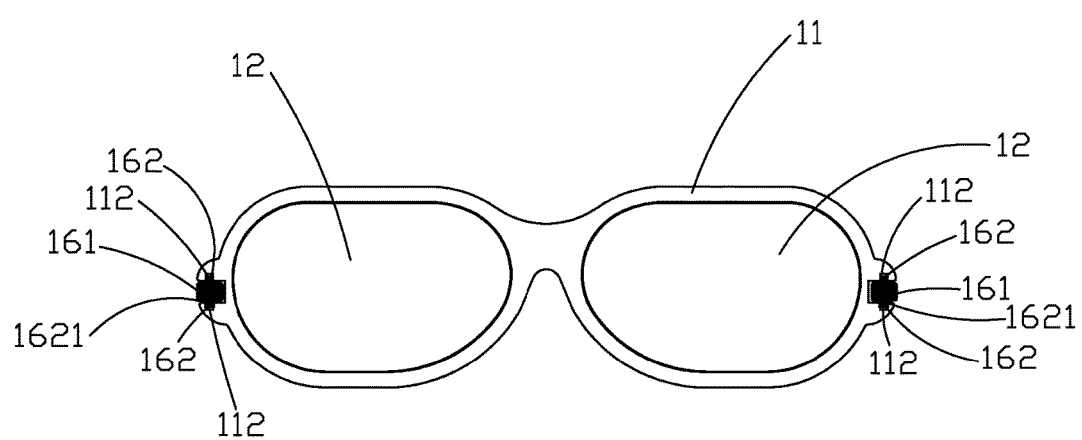
FIG. 25 is a cross-sectional view taken along line B-B of FIG. 24.
Figure 26:
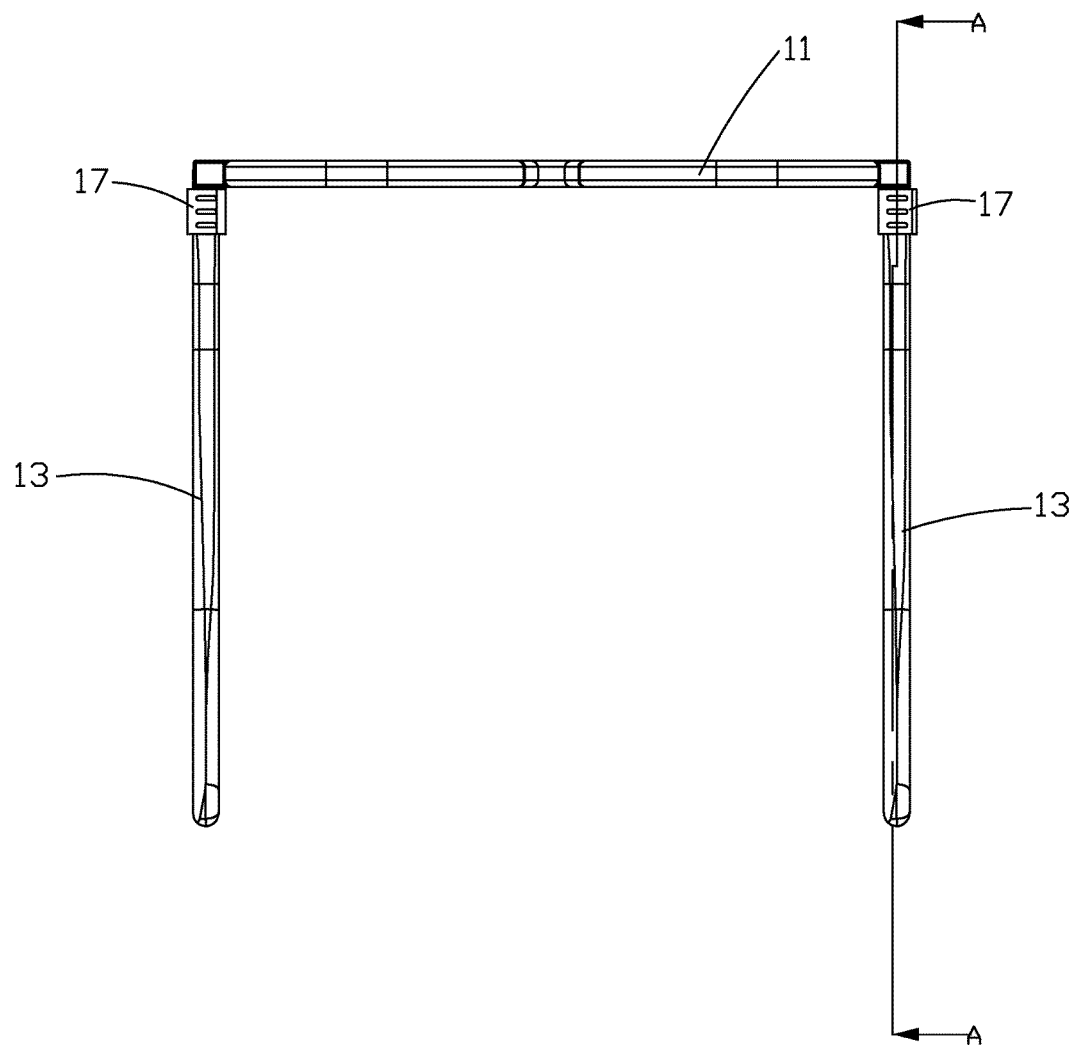
FIG. 26 is a top view of the dual-purpose eyeglasses of FIG. 22.
Figure 27:
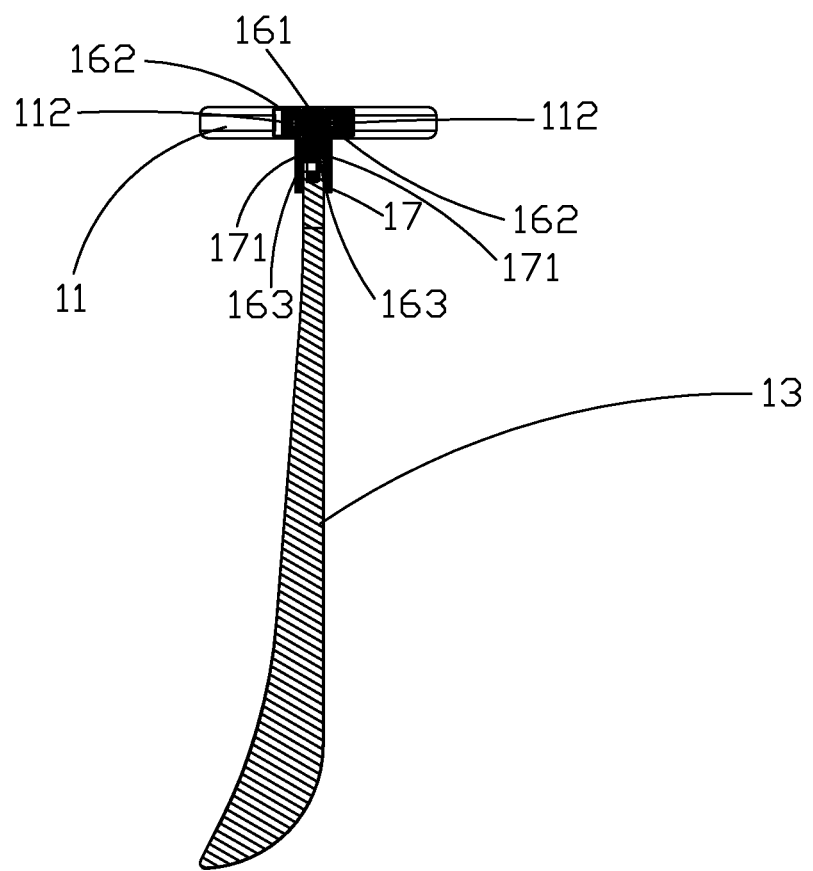
FIG. 27 is a cross-sectional view taken along line A-A of FIG. 26.
Figure 28:
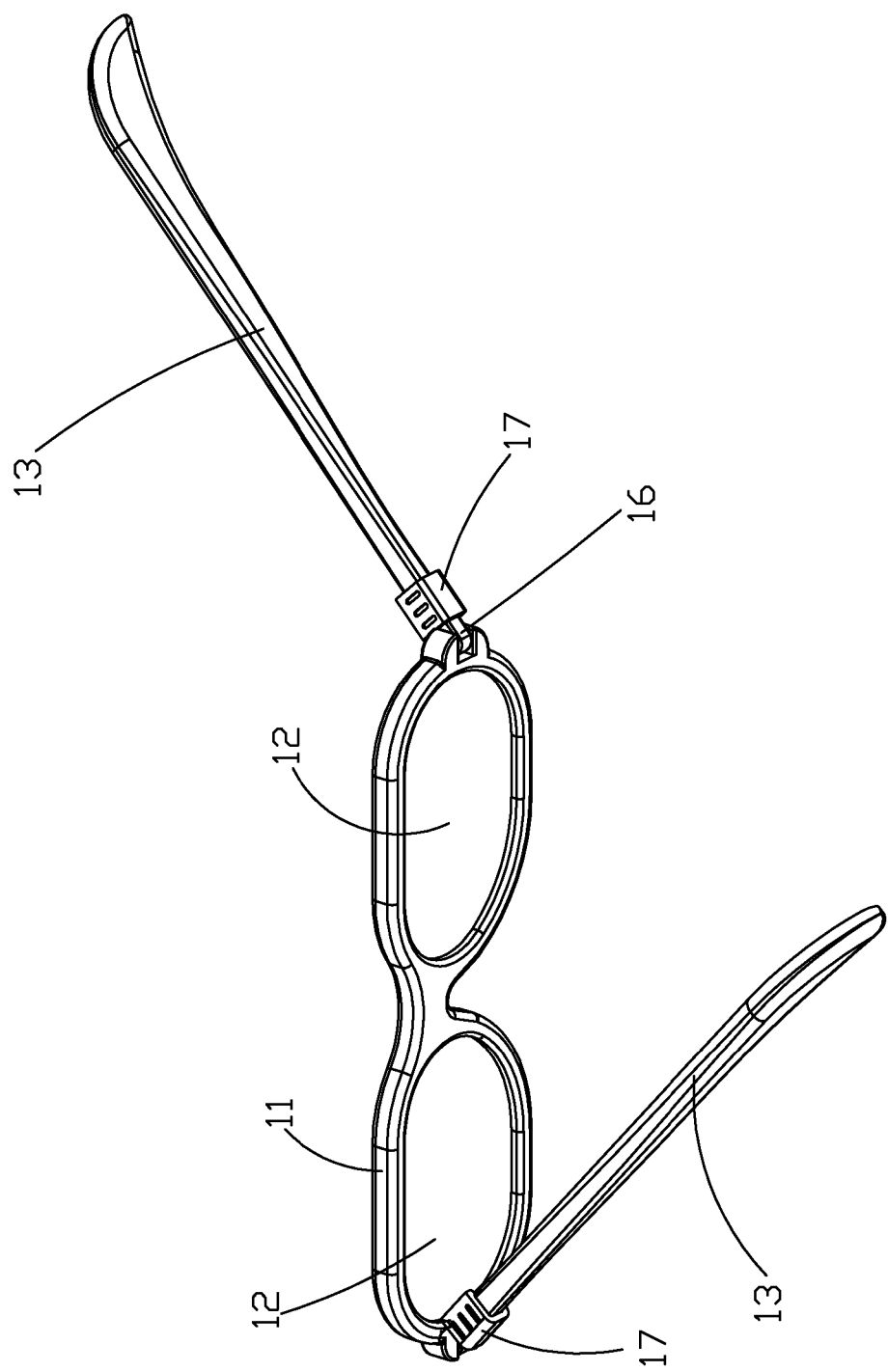
FIG. 28 illustrates the dual-purpose eyeglasses of FIG. 22 showing a pivoting state of the temples.
Figure 29:
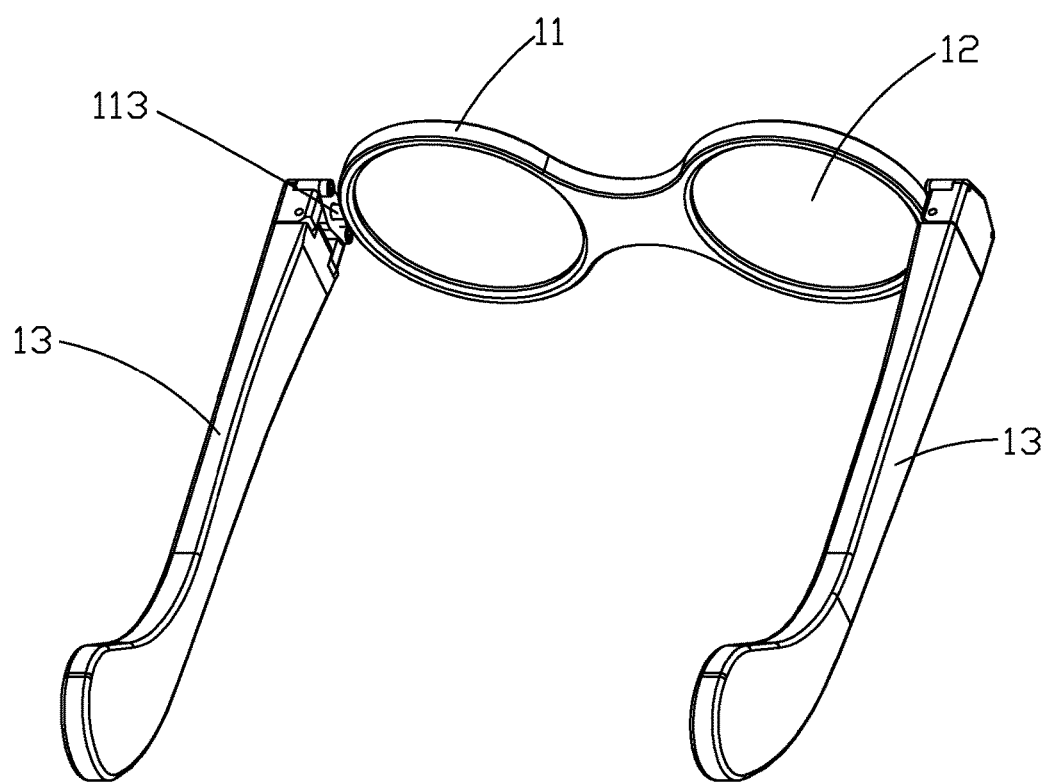
FIG. 29 is a perspective view of a sixth embodiment of the dual-purpose eyeglasses of the present invention.
Figure 30:
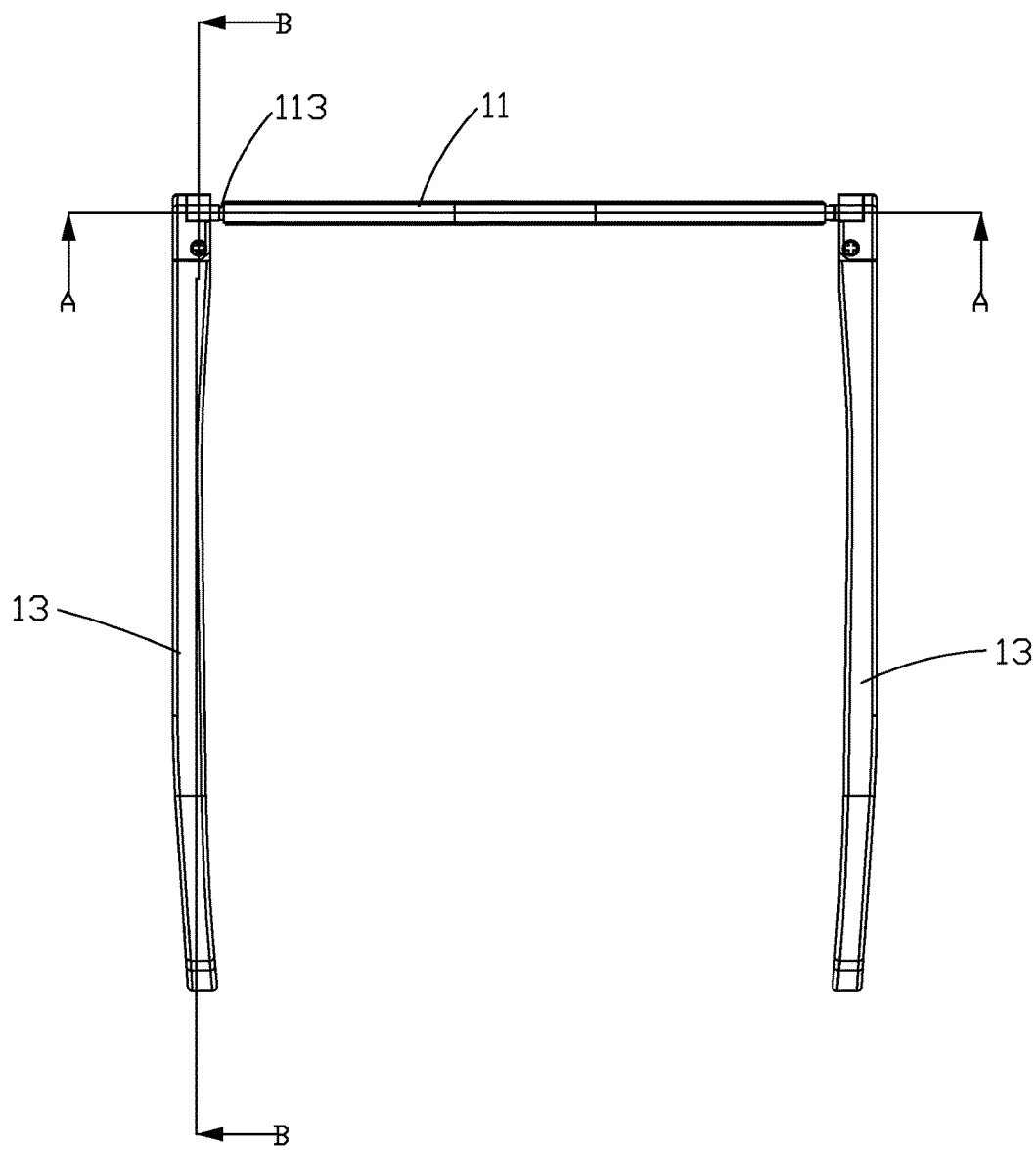
FIG. 30 is a top view of the dual-purpose eyeglasses of FIG. 29.
Figure 31:
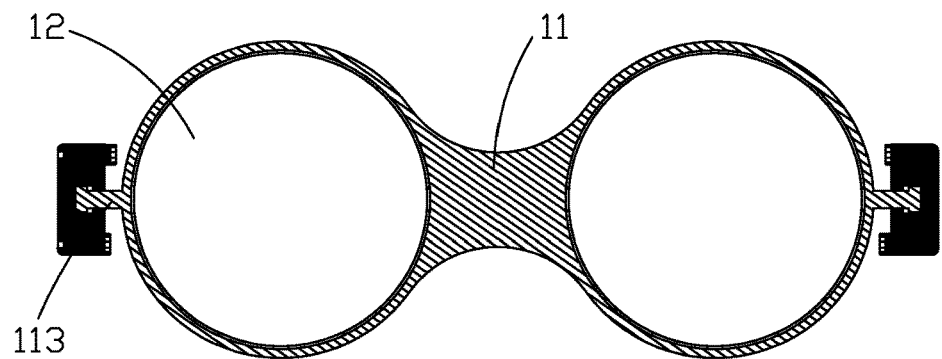
FIG. 31 is a cross-sectional view taken along line A-A of FIG. 30.
Figure 32:
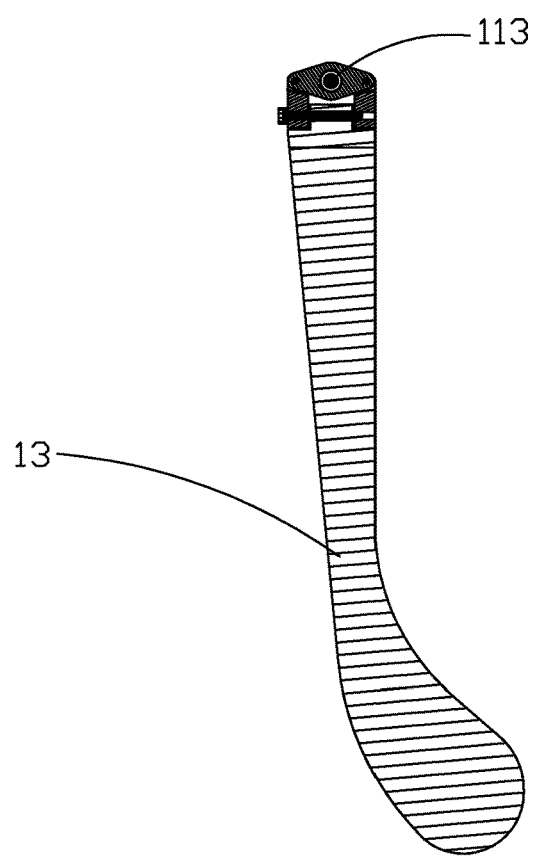
FIG. 32 is a cross-sectional view taken along line B-B of FIG. 30.

As shown in FIG. 2B, the lens of FIG. 2A can be used as sunglasses if it is flipped 180 degrees about a vertical or horizontal direction. In this case, the quarter wave plate layer 200 is located at the inner side, i.e. the side adjacent the eye, while the linear polarizing plate layer 100 is located at the outer side away from the eye. The polarizing axis of the linear polarizing plate layer 100 is still in the vertical direction. It is the reflected light from the outside sunlight that most affects human visual effect and generates uncomfortable feelings. Lights reflected from a car's windshield, a road surface, a sea or water surface, a beach or a snowfield can all affect human visual effect or make people unable to see things clearly. These reflected lights have one common property, i.e. having a horizontal polarization characteristic. This is because a light reflected from a solid or liquid mirror surface is polarized and the polarizing axis is mainly in the horizontal direction. Polarized sunglasses utilize polarizing plates with vertical polarizing axis to filter a considerable portion of the reflected light to thereby enable a viewer to see things more clearly. Specifically, in the present lens structure, when the linear polarizing plate layer 100 faces outwards, the filter function can be achieved. The linear polarizing plate layer 100 first filters the reflected light in the horizontal direction, the remaining light then enters the viewer's eyes through the quarter wave plate layer 200 which, at this time, does not optically process the light therethrough.

In the embodiment of FIG. 2A, when the linear polarizing plate layer 100 is located at the inner side adjacent the eye and the quarter wave plate layer 200 is located at the outer side away from the eye, the polarizing axis of the linear polarizing plate layer 100 is in the vertical direction. However, the direction of the polarizing axis of the linear polarizing plate layer 100 is not intended to be limited to the vertical direction. Rather, it can also be in another direction as long as the optical axis of the linear polarizing plate layer 100 is in the vertical direction when the linear polarizing plate layer 100 is located at the outer side away from the eye.

Figure 35A:
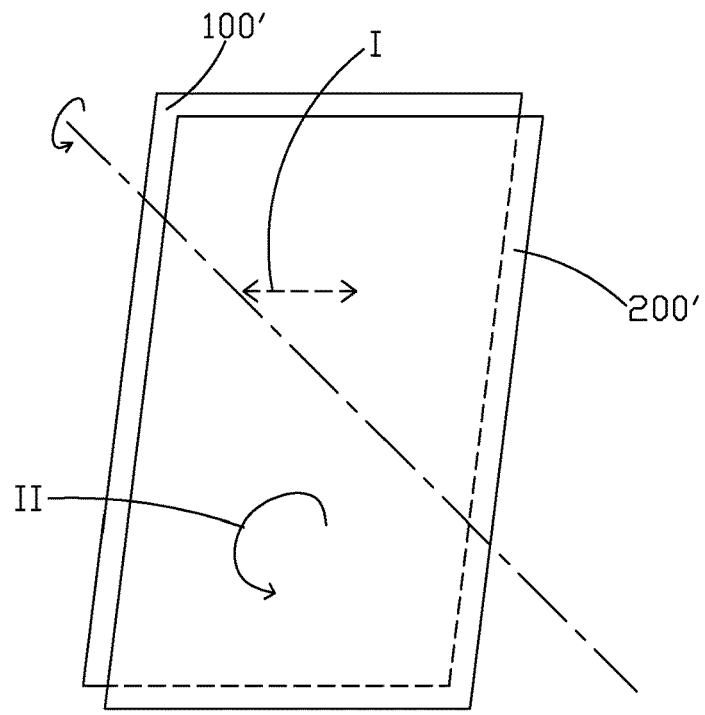
FIG. 35A illustrates an eighth embodiment of the dual-purpose eyeglasses of the present invention which are used as 3D glasses.

For example, in another embodiment illustrated in FIG. 35A which differs from the embodiment of FIG. 2A mainly in the direction of the polarizing axis, when the linear polarizing plate layer 100' is located at the inner side adjacent the eye and the quarter wave plate layer 200' is located at the outer side away from the eye, the polarizing axis of the linear polarizing plate layer 100' is in the horizontal direction. The eyeglasses at this state can also be used as 3D glasses, the optical principle of which is the same as in FIG. 2A and is thus not repeated herein.

Figure 35B:
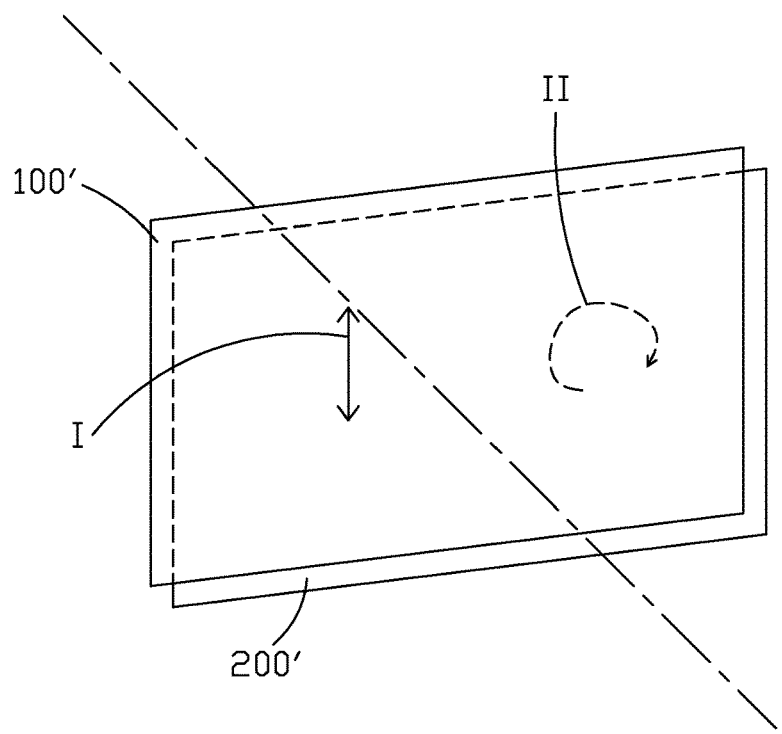
FIG. 35B illustrates an eighth embodiment of the dual-purpose eyeglasses of the present invention which are used as sunglasses.
Figure 36:
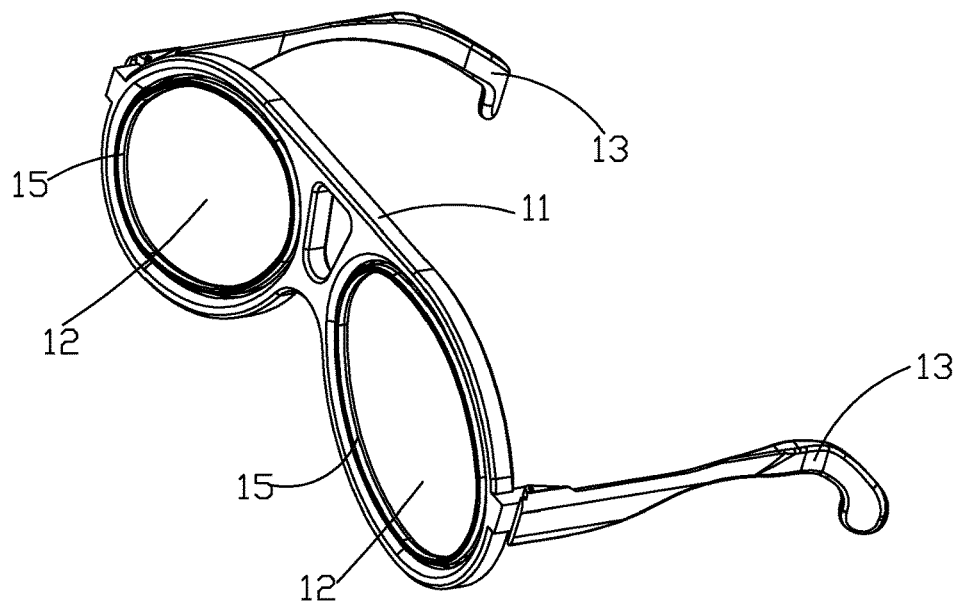
FIG. 36 is a perspective view of the eighth embodiment of the dual-purpose eyeglasses of the present invention.
Figure 37:
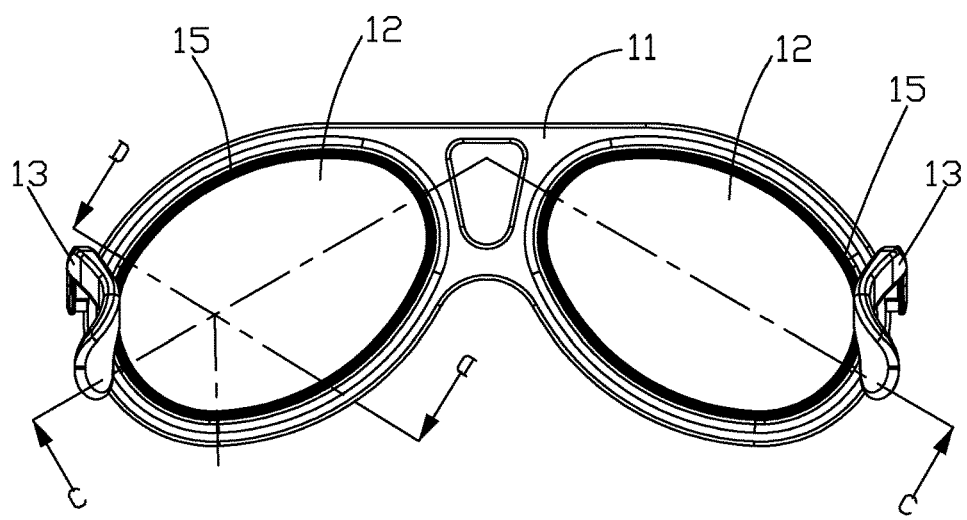
FIG. 37 is a front view of the dual-purpose eyeglasses of FIG. 36.
Figure 38:
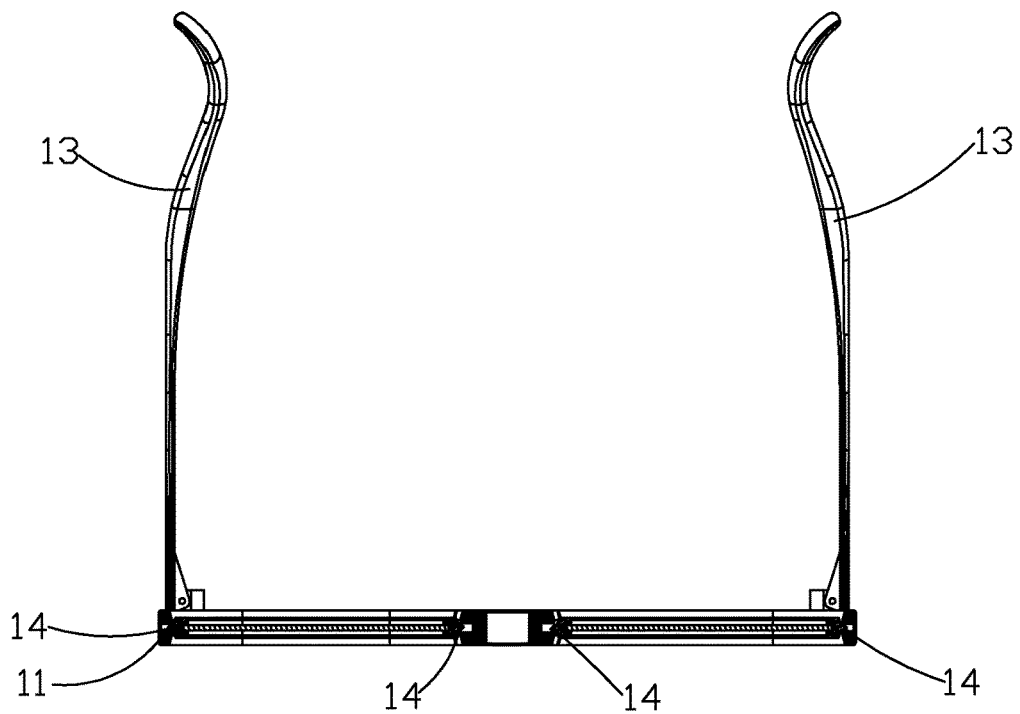
FIG. 38 is a cross-sectional view taken along line C-C of FIG. 37.
Figure 39:
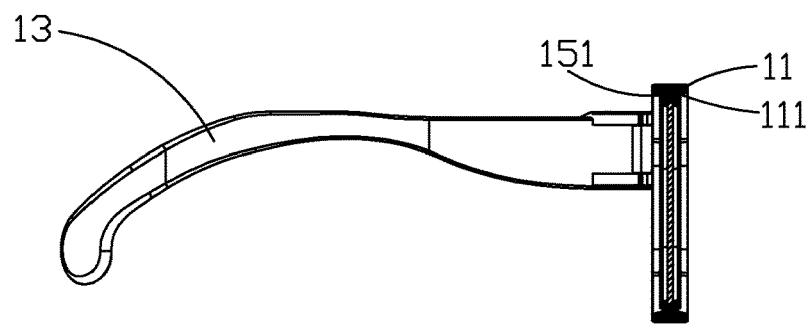
FIG. 39 is a cross-sectional view taken along line D-D of FIG. 37.
Figure 40:
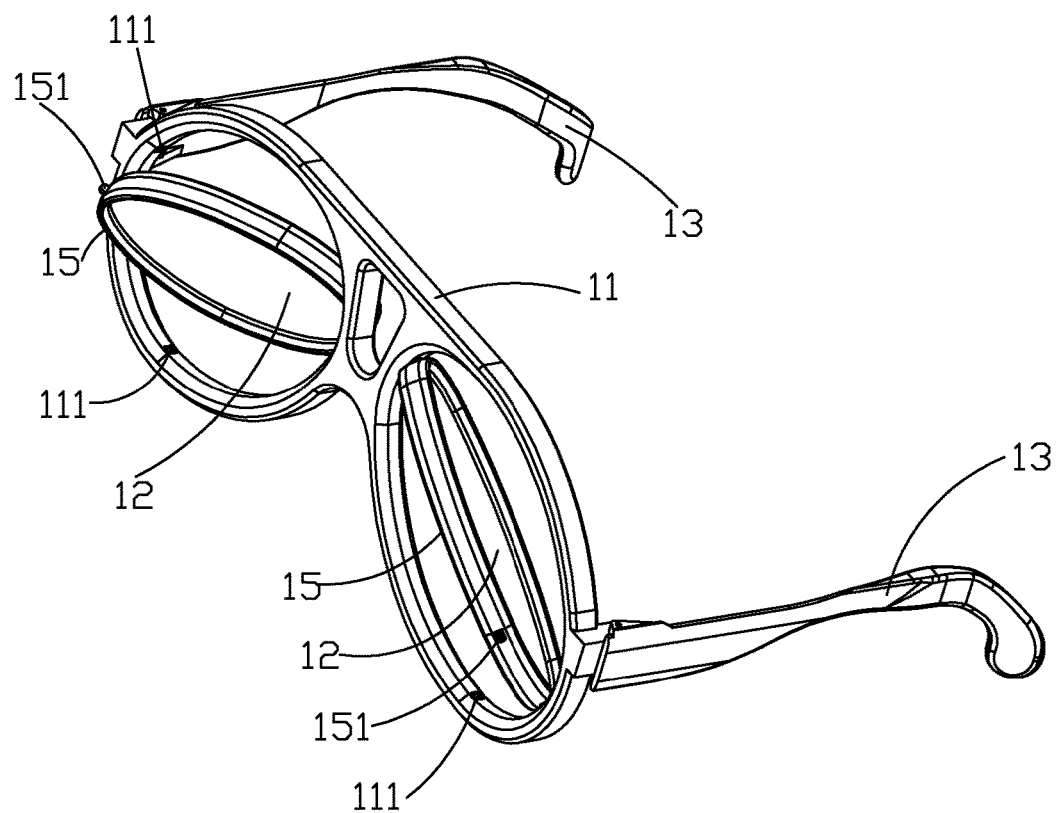
FIG. 40 illustrates the dual-purpose eyeglasses of FIG. 37 showing a pivoting state of the lenses.

Rotating the lens shown in FIG. 35A 180 degrees about a rotating axis at an angle to the horizontal direction can achieve another lens shown in FIG. 35B. The eyeglasses at this state can likewise be used as sunglasses in which the quarter wave plate layer 200' is located at the inner side adjacent the eye and the linear polarizing plate layer 100' is located at the outer side away from the eye, and the polarizing axis of the linear polarizing plate layer 100' is rotated from the horizontal direction to the vertical direction. In one embodiment of the present invention, the lens is rotated about a rotating axis at an 45-degree angle to the horizontal direction. The optical principle of the eyeglasses at the state shown in FIG. 35B is the same as in FIG. 2B and is thus not repeated herein.

In practice, the above lens structure can be used to make a pair of dual-purpose eyeglasses with a lens that can be flipped, which permits the user to selectively expose the linear polarizing plate layer 100 or the quarter wave plate layer 200 at the outer side, thus providing the eyeglasses with both sunglasses and 3D glasses functions. Flipping of the lenses can be realized in various ways, and various embodiments of the dual-purpose eyeglasses of the present invention are described below in conjunction with the appended drawings.

FIG. 3 to FIG. 7 illustrate a first embodiment of the dual-purpose eyeglasses of the present invention. The dual-purpose eyeglasses include an eyeglass frame 11, the lenses 12 as described above, and two temples 13. The lenses 12 and the two temples 13 are mounted to the eyeglass frame 11, with the lenses 12 and the temples 13 being rotatable relative to each other. In the present embodiment, the lenses 12 are pivotally mounted to the eyeglass frame 11 and have pivot axles 14 horizontally and pivotably mounted to the eyeglass frame 11. Specifically, the eyeglasses further include lens frames 15, the lenses 12 are fixedly mounted to the lens frames 15, and the pivot axles 14 project from the lens frames 15. In the present embodiment, the eyeglasses have two lens frames 15, and two lenses 12 are fixedly mounted to the two lens frames 15, respectively, and can independently pivot about the horizontal direction.

As an improvement to the above embodiment, notches or protrusions (notches 111 in this embodiment) are formed in an inner side of the eyeglass frame 11, and protrusions or notches (protrusions 151 in this embodiment) are formed on the lens frames 15 at locations corresponding to the notches or protrusions for engaging with the notches or protrusions. When the lenses 12 are rotated in place, the protrusions 151 are engagingly received in the notches 111, thus positioning the lenses 12; if it is desired to rotate the lenses 12, the lenses 12 are pushed such that the protrusions 151 are forced to produce slight deformation thus allowing the protrusions to be released. In addition, pushing blocks 152 are formed on the lens frames 15 to facilitate manually pushing the lenses 12.

FIG. 8 to FIG. 12 illustrate a second embodiment of the dual-purpose eyeglasses of the present invention. The main differences between this embodiment and the first embodiment are that the eyeglasses of this embodiment include one lens frame 15, and the lenses 12 are fixedly mounted to the lens frame 15 and can synchronously rotate about the axis which is in the horizontal direction.

FIG. 13 to FIG. 17 illustrate a third embodiment of the dual-purpose eyeglasses of the present invention. This embodiment differs from the first embodiment mainly in the direction of rotation of the lenses 12. In this embodiment, the pivot axles 14 of the lenses 12 are vertically and pivotably mounted to the eyeglass frame 11 and the lenses 12 are rotatable about the axis in the vertical direction.

FIG. 18 to FIG. 21 illustrate a fourth embodiment of the dual-purpose eyeglasses of the present invention. The main differences between this embodiment and the third embodiment are that the eyeglasses of this embodiment include one lens frame 15, and the lenses 12 are fixedly mounted to the lens frame 15 and can synchronously rotate about an axis in the vertical direction.

In the four embodiments above, the lenses 12 are rotatable relative to the eyeglass frame 11. It should be noted, however, that it is also possible that the temples 13 are rotatable relative to the eyeglass frame 11 while the lenses 12 are not rotatable. FIG. 22 to FIG. 28 illustrate a fifth embodiment of the dual-purpose eyeglasses of the present invention. The two temples 13 of this embodiment is pivotably mounted to the eyeglass frame 11. One end of each temple 13 includes a connecting member 16 which is pivotably mounted to the eyeglass frame 11 and rotatable about the axis in the vertical direction. The connecting member 16 includes a main body 161 and two pivot axles 162 projecting from opposite sides of the main body 161, respectively. The eyeglass frame 11 has connecting holes 112 for rotatably receiving the two pivot axles 162, respectively. One of the pivot axles 162 includes projecting teeth 1621 extending outwardly from opposite sides of that pivot axle 162. The connecting hole 112 for engaging with the rotating axle 162 having the projecting teeth 1621 is a stepped hole which is shaped corresponding to the pivot axle 162. When it is desired to change the orientation of the temple 13, the temple 13 is rotated to cause the projecting teeth 1621 of the pivot axle 162 to produce slight deformation, thus unlocking the pivot axle 162 from the connecting hole 112. When the temple 13 is rotated 180 degrees, the projecting teeth 1621 of the pivot axle 162 are again engaged into the stepped hole, thus re-positioning the temple 13.

Further, the temple 13 is pivotably connected to the connecting member 16. A positioning sleeve 17 is attached around a portion of the temple 13 where the temple 13 is pivotably connected to the connecting member 16. The positioning sleeve 17 is slidable along the temple 13. A protrusion or recess (a protrusion 171 in this embodiment) is formed in the positioning sleeve 17. A recess or protrusion (a recess 163 in this embodiment) is formed on the connecting member 16 at a location corresponding to the protrusion 171 or recess for engaging with the protrusion 171 or recess. Once the protrusion 171 is engaged into the recess 163, rotation of the temple 13 is prevented due to the limiting function of the positioning sleeve 17. When it is desired to fold the temple 13, the positioning sleeve 17 is pushed to cause slight deformation of the protrusion 171 thus allowing the protrusion 171 to be released from the recess 163. After the positioning sleeve 17 is slid to the temple 13 and completely away from the portion of the temple 130 where the temple 130 is pivotably connected to the connecting member 16, the temple 13 becomes foldable.

FIG. 29 to FIG. 32 illustrate a sixth embodiment of the dual-purpose eyeglasses of the present invention. This embodiment differs from the above fifth embodiment in the direction of rotation of the temple 13. In this embodiment, horizontal connecting pins 113 project from the eyeglass frame 11. Each temple 13 is pivotably attached around a corresponding connecting pin 113 and rotatable about the axis in the horizontal direction. When it is desired to change the direction of the temple 13, the temple 13 is rotated 180 degrees about the horizontal direction, and the eyeglasses are turned upside down, thereby changing the function of the eyeglasses.

Figure 33:
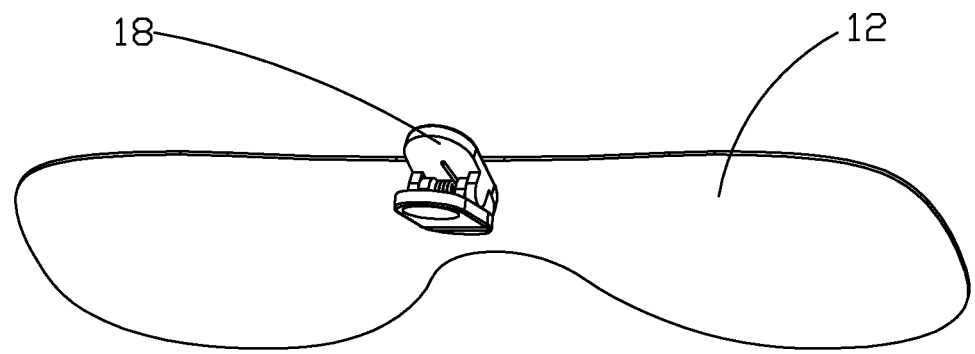
FIG. 33 is a perspective view of a seventh embodiment of the dual-purpose eyeglasses of the present invention.
Figure 34:
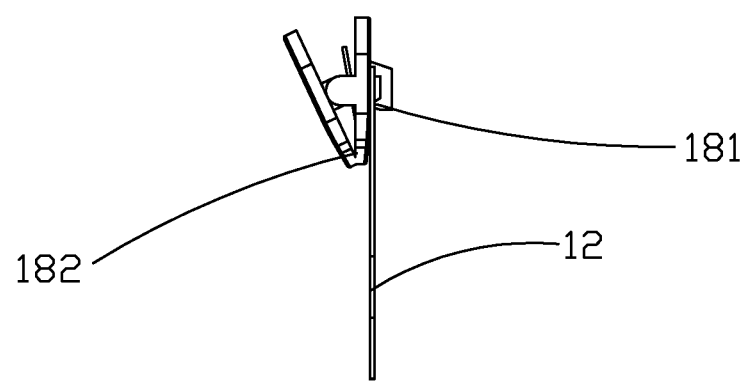
FIG. 34 is a top view of the dual-purpose eyeglasses of FIG. 33.

As another application of the present invention, the above lens structure can be disposed at an outside of another type of eyeglasses, for example, nearsighted eyeglasses. FIG. 33 to FIG. 34 illustrate a sixth embodiment of the dual-purpose eyeglasses of the present invention, which includes the lens 12 as described above and a clamp 18. The clamp 18 includes a first clamping portion 181 for clamping the lens 12 and a second clamping portion 182 for clamping another pair of eyeglasses (not shown). When a person already wearing eyeglasses wears the present dual-purpose eyeglasses, he or she uses the second clamping portion 182 to clamp his or her eyeglasses. When it is desired to change the function of the eyeglasses, the user only needs to remove the lens 12 from the first clamping portion 181, change the orientation of the lens 12, and re-clamp the lens 12 to the first clamping portion 181.

FIG. 36 to FIG. 40 illustrate an eighth embodiment of the dual-purpose eyeglasses of the present invention. This embodiment differs from the various above embodiments mainly in that in this embodiment the pivot axles 14 of the lenses 12 are obliquely and pivotably connected to the eyeglass frame 11 and are oriented at a 45-degree angle to the horizontal direction. Specifically, the eyeglasses further include lens frames 15 to which the lenses 12 are fixedly mounted, and the pivot axles 14 project from the lens frames 15. In this embodiment, the eyeglasses have two lens frames 15, two lenses 2 are fixedly mounted to the two lens frames 15, respectively, and are independently pivotable about the pivot axle 14.

In summary, the lenses provided by the present invention include a quarter wave plate layer and a linear polarizing plate layer. Any one of the quarter wave plate layer and the linear polarizing plate layer can be disposed at the outer side away from the user's eyes by adjusting the orientation of the lenses of the present invention. When the linear polarizing plate layer is located at the outer side away from the user's eyes, the optical axis of the linear polarizing plate layer is in the vertical direction. Thus, the dual-purpose eyeglasses with both sunglasses and 3D glasses functions can be achieved. Adjusting the orientation of the lenses can be implemented in various ways. For example, a pivot axle can be disposed along the vertical direction, horizontal direction or an oblique direction at an angle to the horizontal direction. The adjustment operation is simple and convenient allowing the users to adjust the lens orientation to select a corresponding function by themselves according to needs. In comparison with the existing 3D glasses or sunglasses with single function, the eyeglasses of the present invention can be used for two purposes and have more practical value.

It will be apparent to those skilled in the art that various modifications and variations can be made to the disclosed structure without departing from the scope or spirit of the invention. In view of the foregoing, it is intended that the present invention cover modifications and variations of this invention provided they fall within the scope of the following claims and their equivalents.

What is claimed is:
1. A lens structure characterized in that:
the lens comprises a quarter wave plate layer and a linear polarizing plate layer, and the lens has two outer surfaces which are respectively and simultaneously defined by one surface of the quarter wave plate layer and one surface of the linear polarizing plate layer;
wherein the lens is configured to allow the location of the quarter wave plate layer and the location of the linear polarizing plate layer exchangeable between an inner side adjacent to a viewer's eye and an outer side away from the eye, and
wherein when the linear polarizing plate layer is located at the inner side and the quarter wave plate layer is located at the outer side, the lens allows only a circularly polarized light to pass through;
when the linear polarizing plate layer is located at the outer side and the quarter wave plate layer is located at the inner side, a polarizing axis of the linear polarizing plate layer is in a vertical direction and the lens filters a portion of light which has a horizontal polarization characteristic.

2. A pair of dual-purpose eyeglasses with sunglasses and 3D glasses functions, comprising an eyeglass frame, and lenses and two temples mounted to the eyeglass frame, characterized in that each lens comprises a quarter wave plate layer and a linear polarizing plate layer, and the lens has two outer surfaces which are respectively and simultaneously defined by one surface of the quarter wave plate layer and one surface of the linear polarizing plate layer, the lenses and the two temples being pivotable relative to each other to allow the location of the quarter wave plate layer and the location of the linear polarizing plate layer being exchangeable between an outer side of the lens away from a viewer's eye and an inner side adjacent to the eye;
  wherein, when the linear polarizing plate layer is located at the inner side of the lens adjacent to the viewer's eye and the quarter wave plate layer is located at an outer side away from the eye, the lens allows only a circularly polarized light to pass through;
  when the linear polarizing plate layer is located at an outer side of the lens away from a viewer's eye and the quarter wave plate layer is located at an inner side adjacent to the eye, a polarizing axis of the linear polarizing plate layer is in a vertical direction and the lens filters a portion of light which has a horizontal polarization characteristic.

3. The pair of dual-purpose eyeglasses with sunglasses and 3D glasses functions according to claim 2, characterized in that each lens is pivotably mounted to the eyeglass frame and has a pivot axle connected to the eyeglass frame, one of the pivot axles being vertically or horizontally connected to the eyeglass frame or obliquely connected to the eyeglass frame at an angle to the horizontal direction.

4. The pair of dual-purpose eyeglasses with sunglasses and 3D glasses functions according to claim 3, characterized in that the eyeglasses further comprise a lens frame to which the lenses are fixedly mounted, and the pivot axle projects from the lens frame.

5. The pair of dual-purpose eyeglasses with sunglasses and 3D glasses functions according to claim 4, characterized in that one of the pivot axles is vertically or horizontally pivotably connected to the lens frame, the eyeglasses have one such lens frame, and the lenses are fixedly mounted to the lens frame and synchronously rotatable about the horizontal direction or vertical direction.

6. The pair of dual-purpose eyeglasses with sunglasses and 3D glasses functions according to claim 4, characterized in that the eyeglasses have two such lens frames, each lens frame is fixedly mounted with one such lens, and the two lenses are independently pivotable about a horizontal direction, a vertical direction or an oblique direction of one of the pivot axles.

7. The pair of dual-purpose eyeglasses with sunglasses and 3D glasses functions according to claim 4, characterized in that a notch or protrusion is formed in an inner side of the eyeglass frame, and a protrusion or notch is formed on the lens frame at a location corresponding to the notch or protrusion of the eyeglass frame for engaging with the notch or protrusion of the eyeglass frame.

8. The pair of dual-purpose eyeglasses with sunglasses and 3D glasses functions according to claim 4, characterized in that a pushing block projects from one of the lenses frame for facilitating pushing the lens.

9. The pair of dual-purpose eyeglasses with sunglasses and 3D glasses functions according to claim 3, characterized in that an angle between one of the pivot axles of the lens and the horizontal direction is a 45-degree angle, when one of the lenses is flipped such that the linear polarizing plate layer is located at the inner side adjacent to the viewer's eye, the polarizing axis of the linear polarizing plate layer is in the horizontal direction.

10. The pair of dual-purpose eyeglasses with sunglasses and 3D glasses functions according to claim 2, characterized in that the two temples are pivotably mounted to the eyeglass frame.

11. The pair of dual-purpose eyeglasses with sunglasses and 3D glasses functions according to claim 10, characterized in that one end of each temple comprises a connecting member, and the connecting member is rotatably mounted to the eyeglass frame and rotatable about a vertical direction.

12. The pair of dual-purpose eyeglasses with sunglasses and 3D glasses functions according to claim 11, characterized in that the connecting member comprises a main body and two pivot axles projecting from opposite sides of the main body, respectively; the eyeglass frame has connecting holes for rotatably receiving the two pivot axles, respectively; one of the pivot axles comprises projecting teeth extending outwardly from opposite sides of that pivot axle; one of the connecting holes for engaging with one of the pivot axles having the projecting teeth is a stepped hole which is shaped corresponding to the pivot axle.

13. The pair of dual-purpose eyeglasses with sunglasses and 3D glasses functions according to claim 11, characterized in that: one of positioning sleeves is slidable along one of the temples, a protrusion or recess is formed in the one of the positioning sleeves, a recess or protrusion is formed on the connecting member at a location corresponding to the protrusion or recess of one of the positioning sleeves for engaging with the protrusion or recess of the positioning sleeves.

14. The pair of dual-purpose eyeglasses with sunglasses and 3D glasses functions according to claim 10, characterized in that horizontal connecting pins project from the eyeglass frame, the temples are rotatably attached around the connecting pins and rotatable about the horizontal direction.

15. A pair of dual-purpose eyeglasses with sunglasses and 3D glasses functions, characterized in that the dual-purpose eyeglasses comprise a lens and a clamp, the lens comprises a quarter wave plate layer and a linear polarizing plate layer, a polarizing axis of the linear polarizing plate layer is in a vertical direction, and the lens has two outer surfaces which are respectively and simultaneously defined by one surface of the quarter wave plate layer and one surface of the linear polarizing plate layer, the clamp comprises a first clamping portion for clamping the lens and a second clamping portion for clamping another pair of eyeglasses;
  wherein the lens is detachably clamped in the first clamping portion of the clamp to allow the location of the quarter wave plate layer and the location of the linear polarizing plate layer exchangeable between an outer side of the lens away from a viewer's eye and an inner side adjacent to the eye;
  wherein, when the linear polarizing plate layer is located at the inner side of the lens away from a viewer's eye and the quarter wave plate layer is located at the outer side away from the eye, the lens allows only a circularly polarized light to pass through;
  when the linear polarizing plate layer is located at the outsider side of the lens away from a viewer's eye and the quarter wave plate layer is located at the inner side away from the eye, a polarizing axis of the linear polarizing plate layer is in a vertical direction and the lens filters a portion of light which has a horizontal polarization characteristic.

\* \* \* \* \*